March 23, 1965 W. JONES ETAL 3,174,259
ARTICLE CARTONING MACHINE
Filed Nov. 16, 1961 21 Sheets-Sheet 17

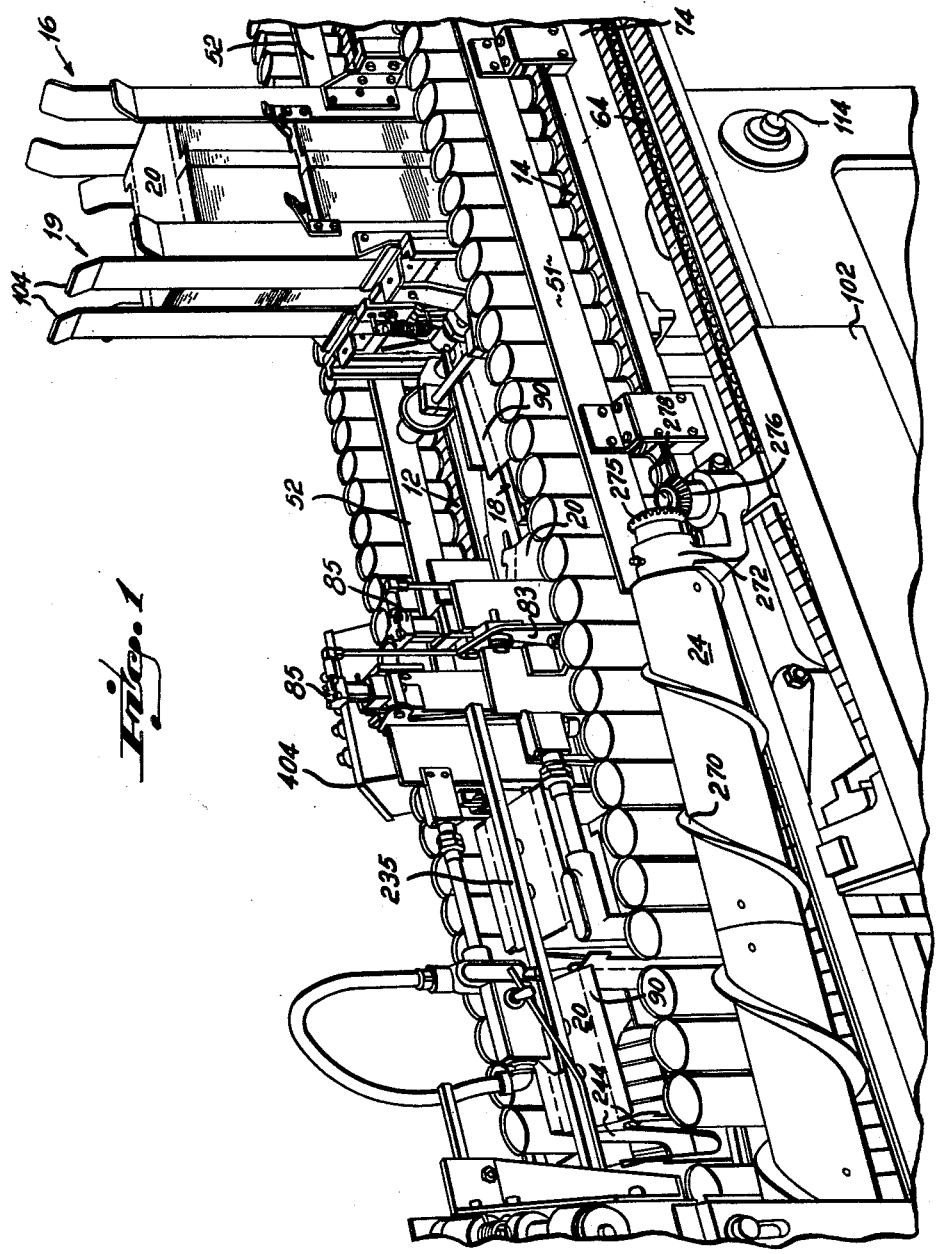

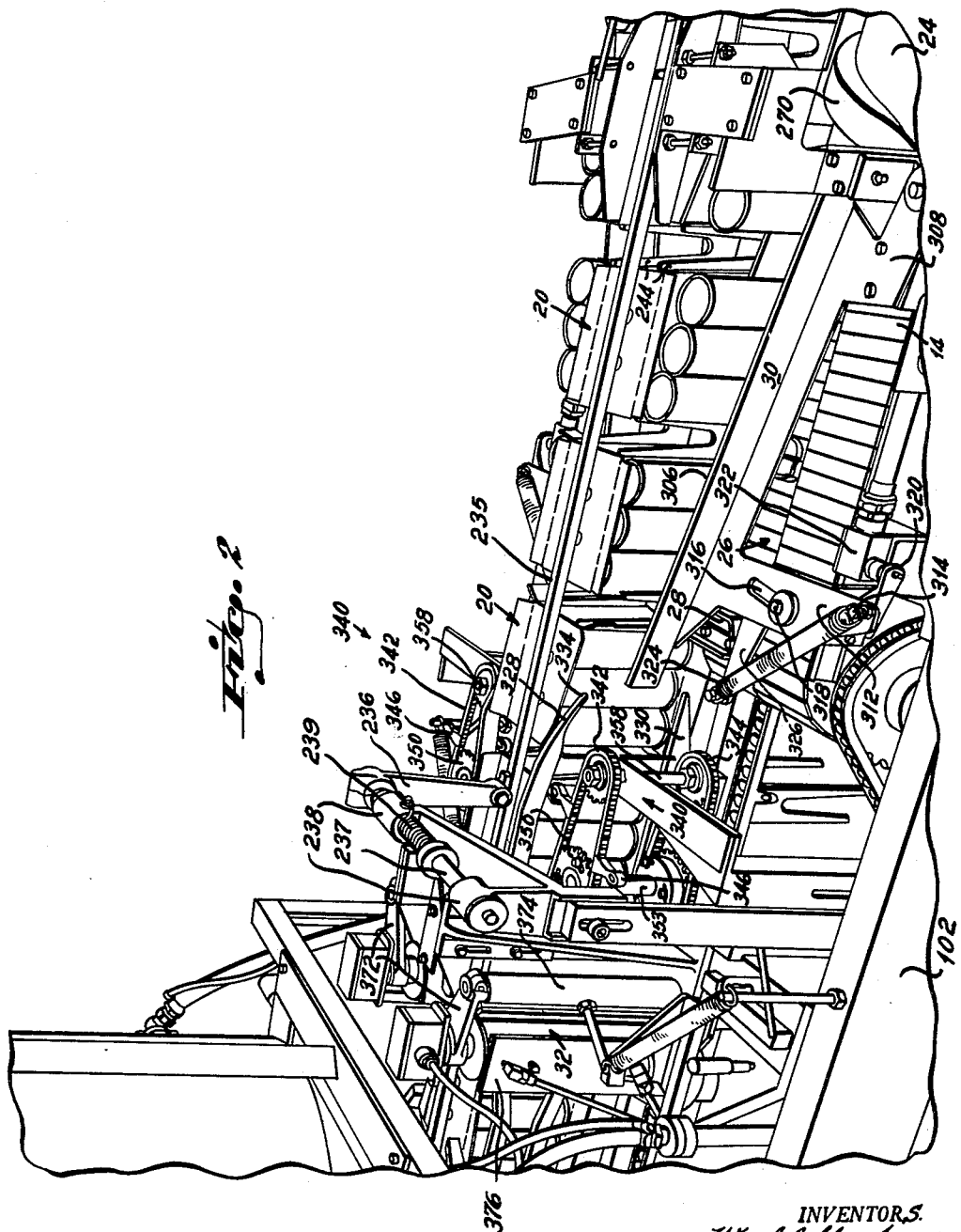

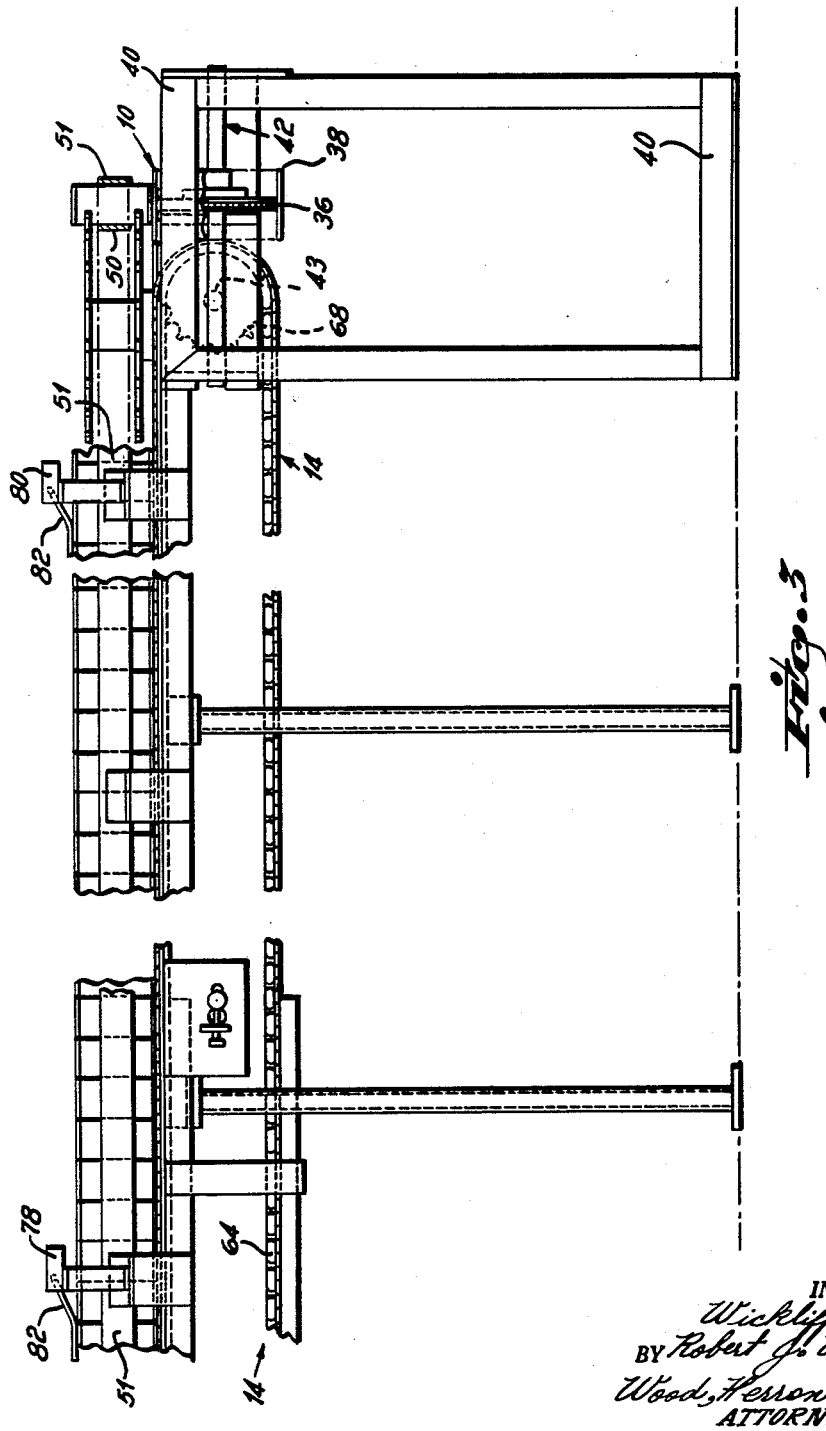

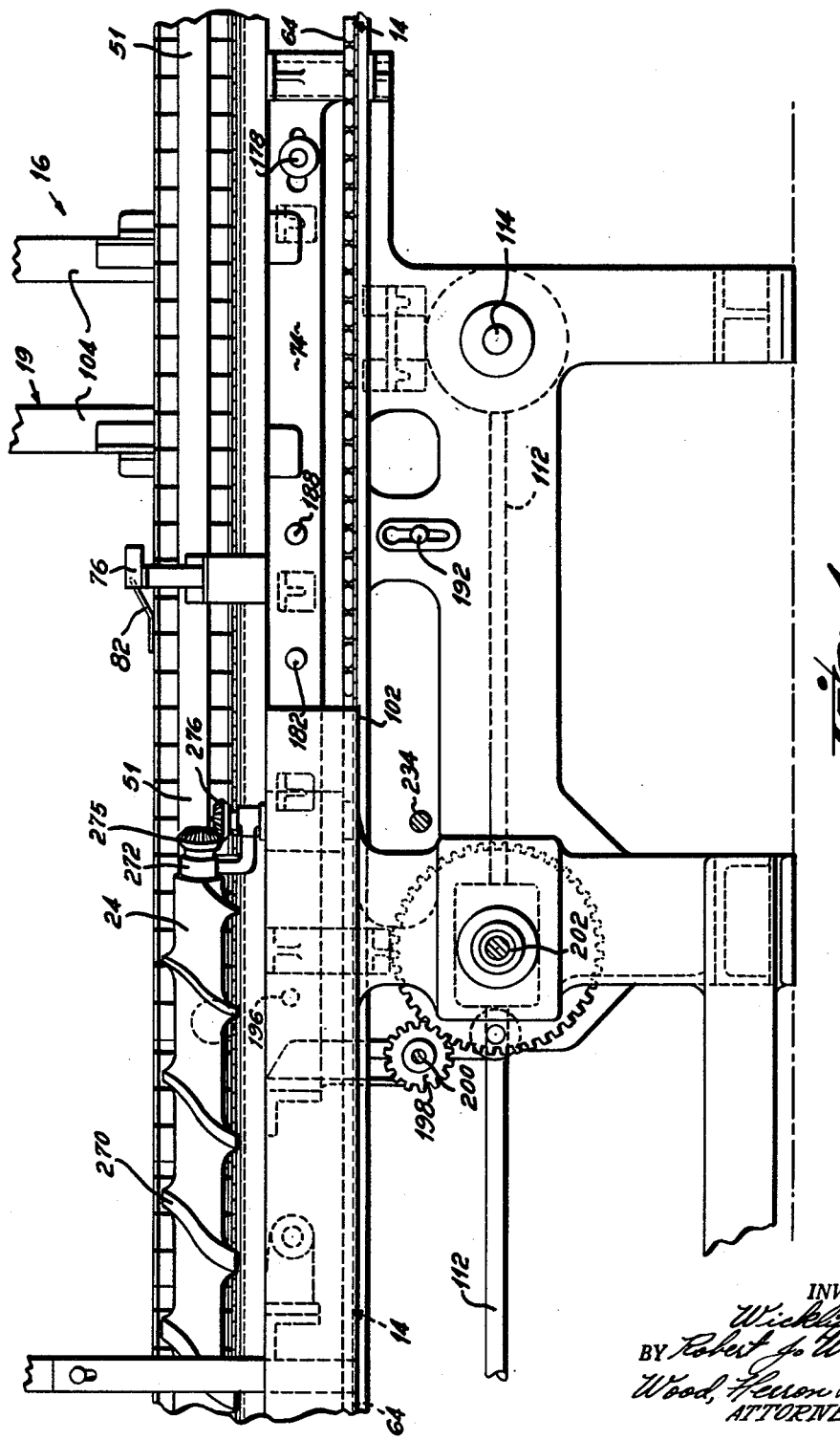

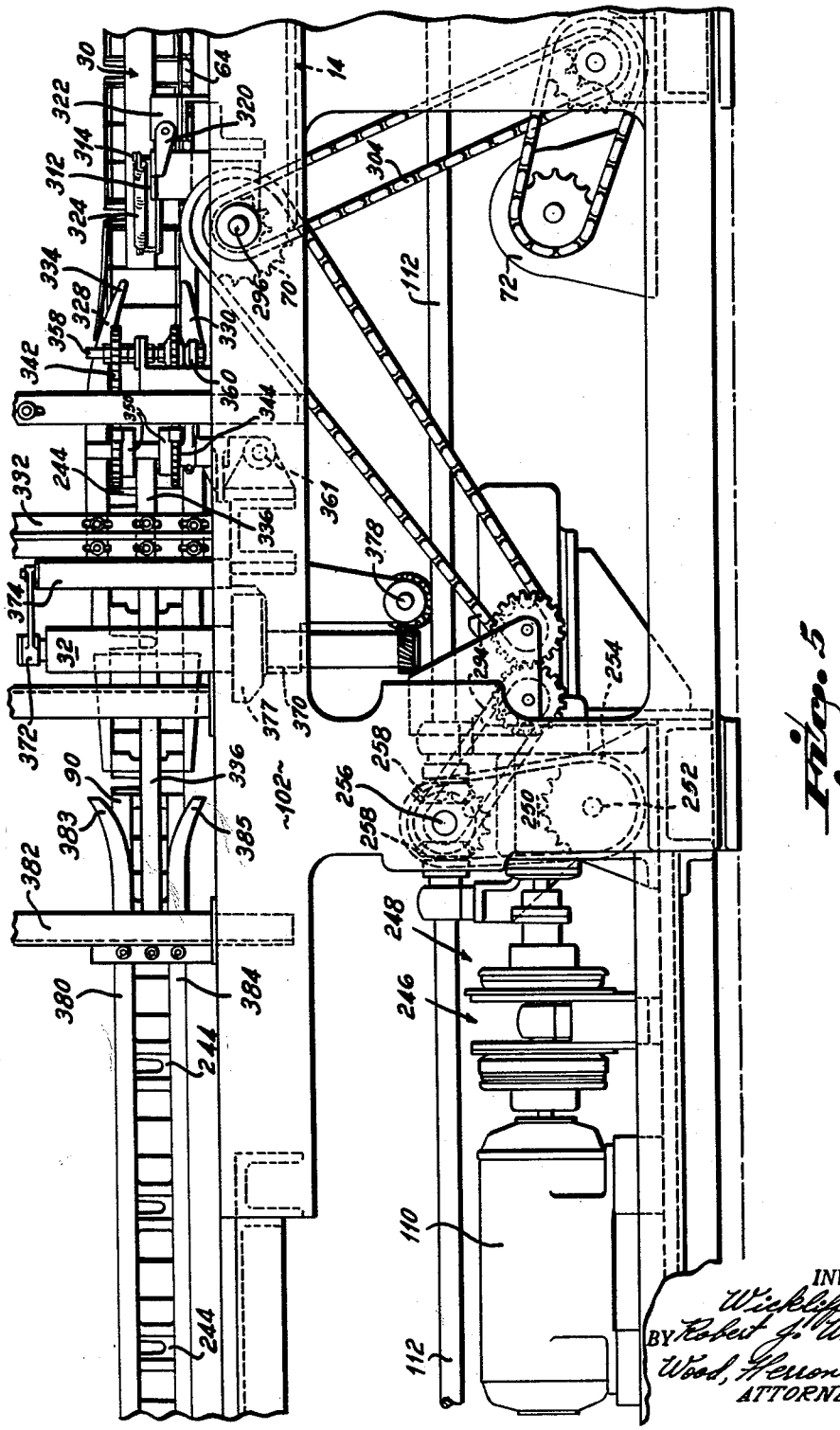

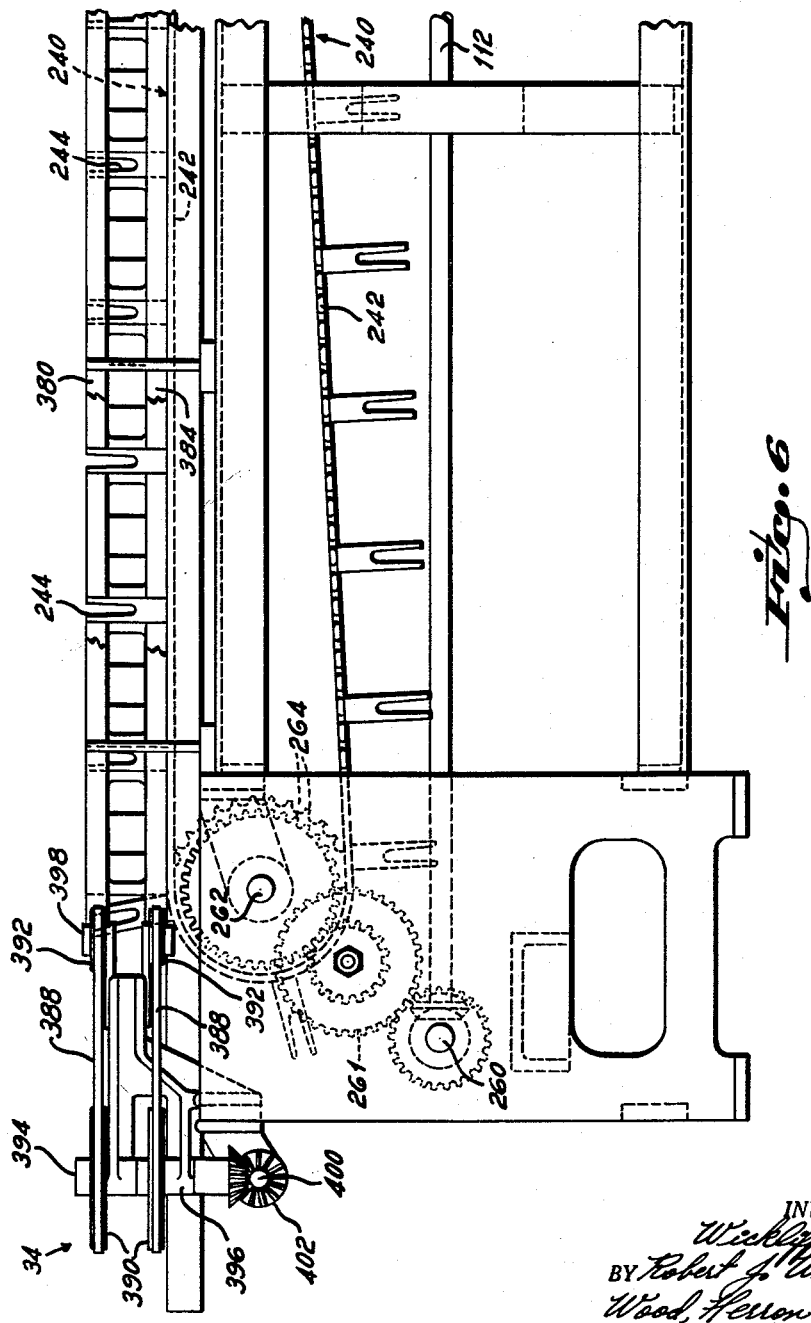

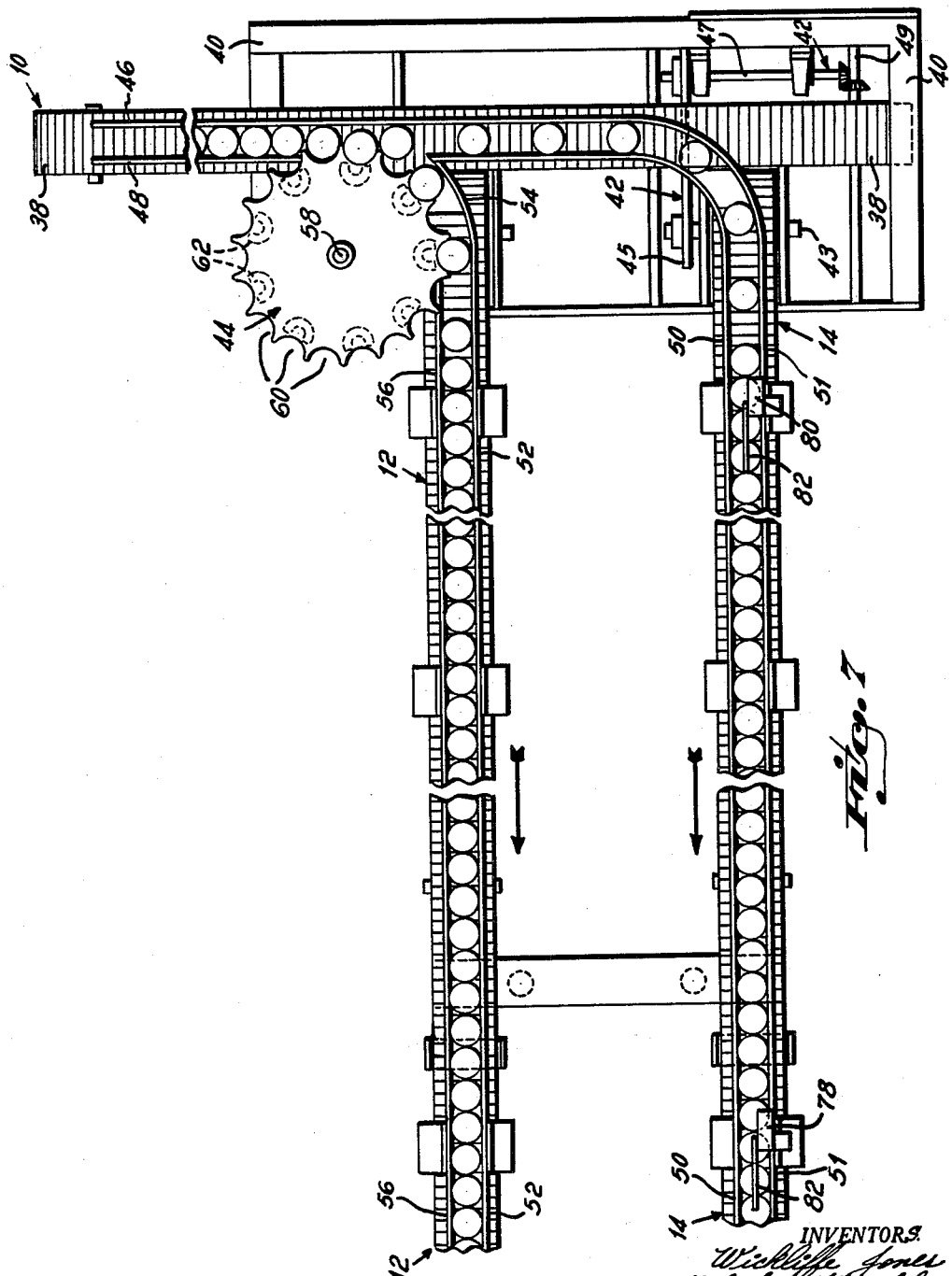

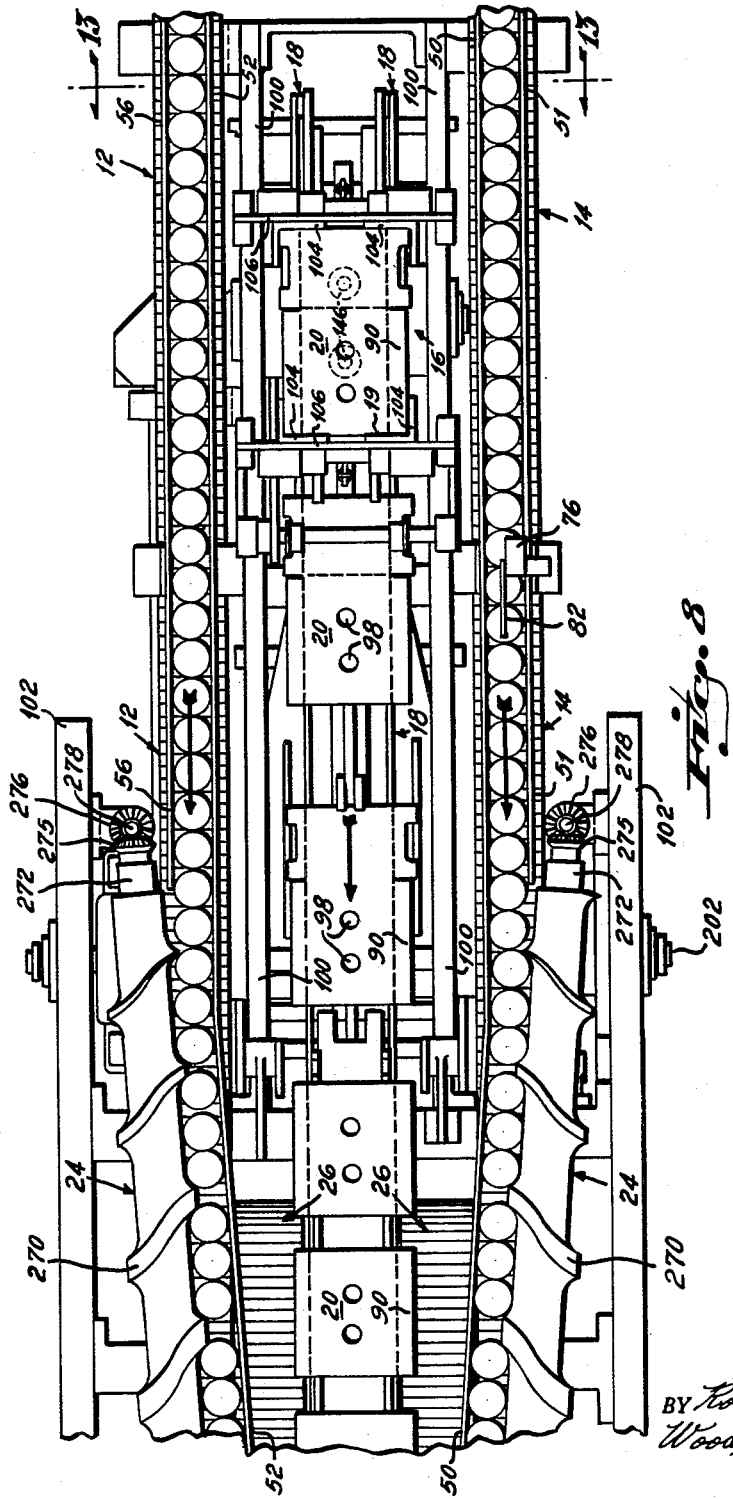

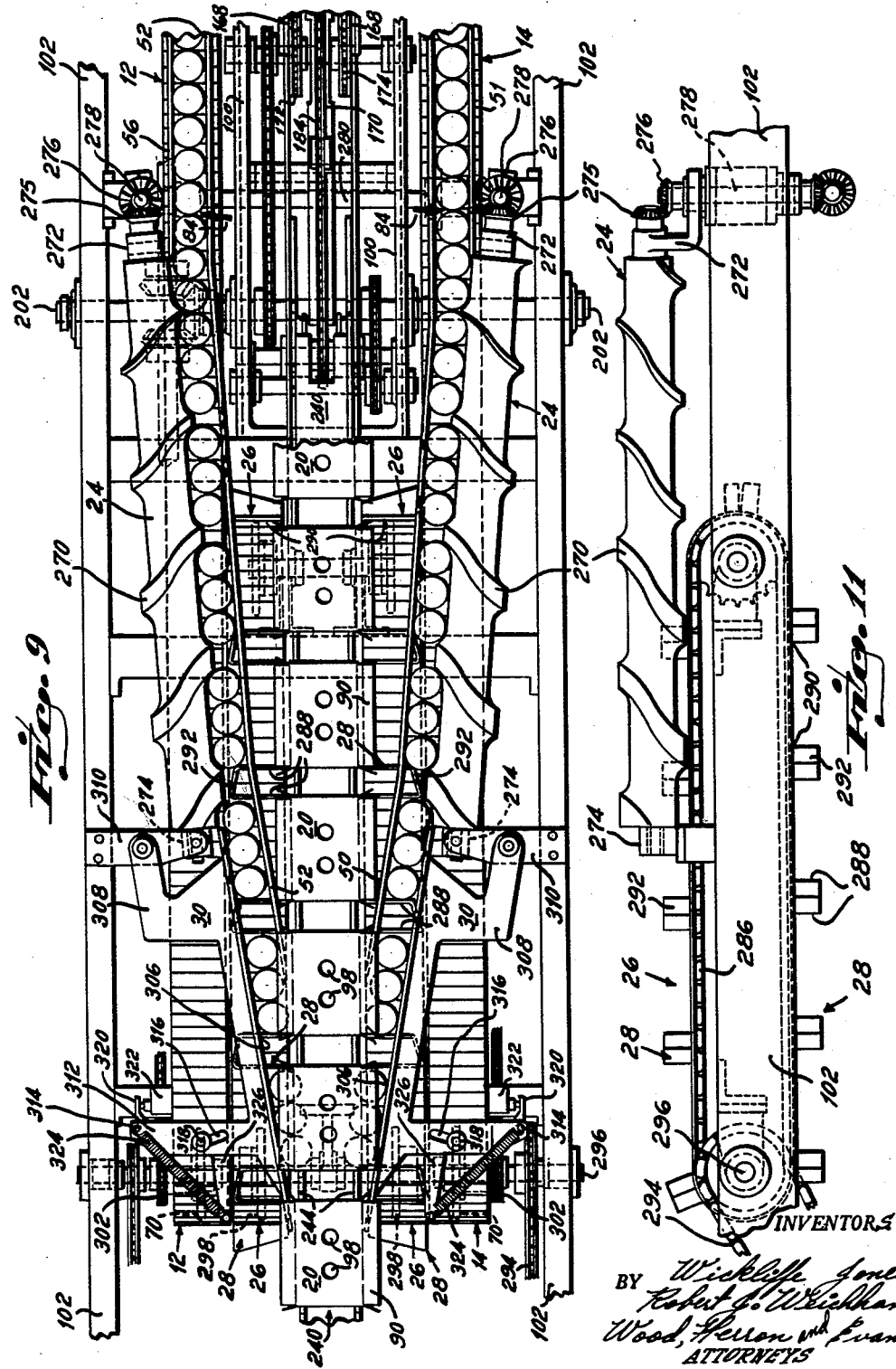

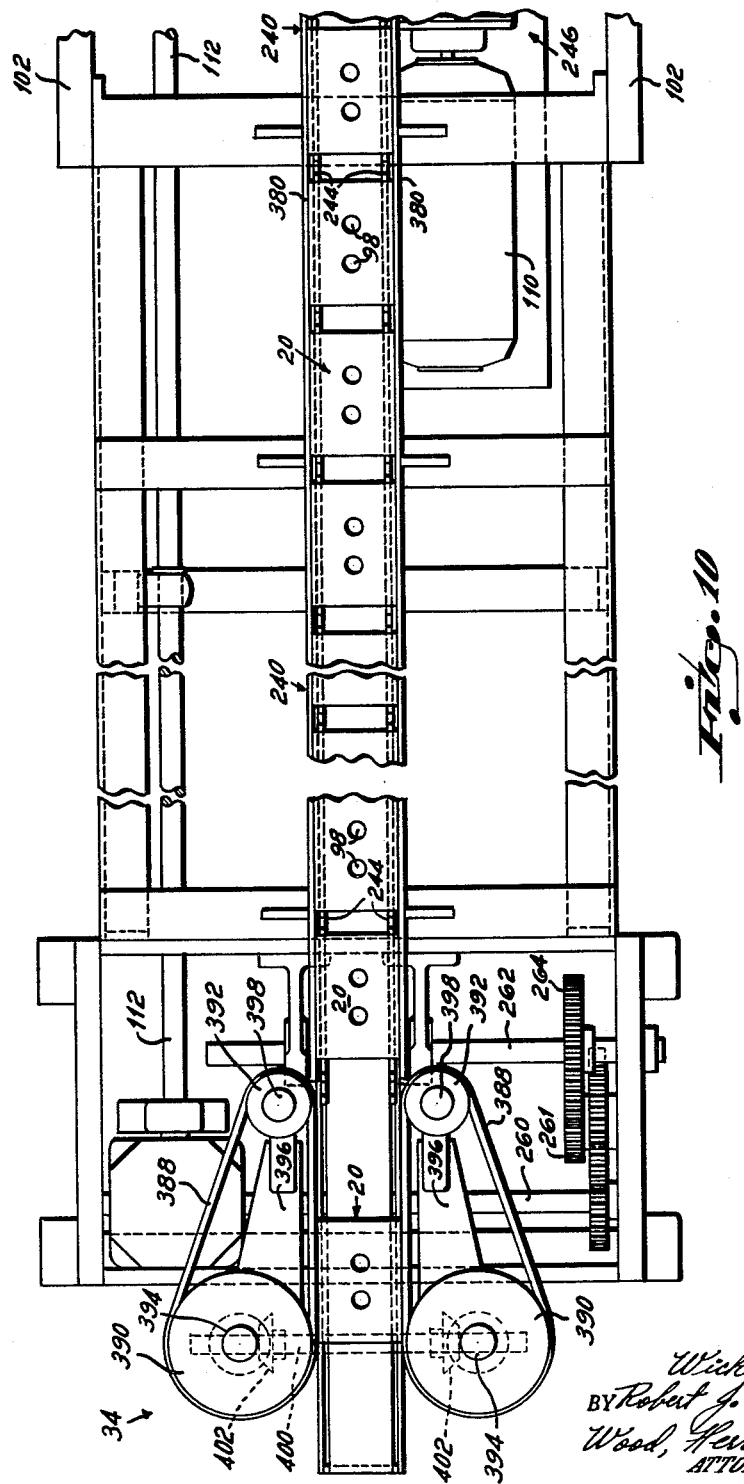

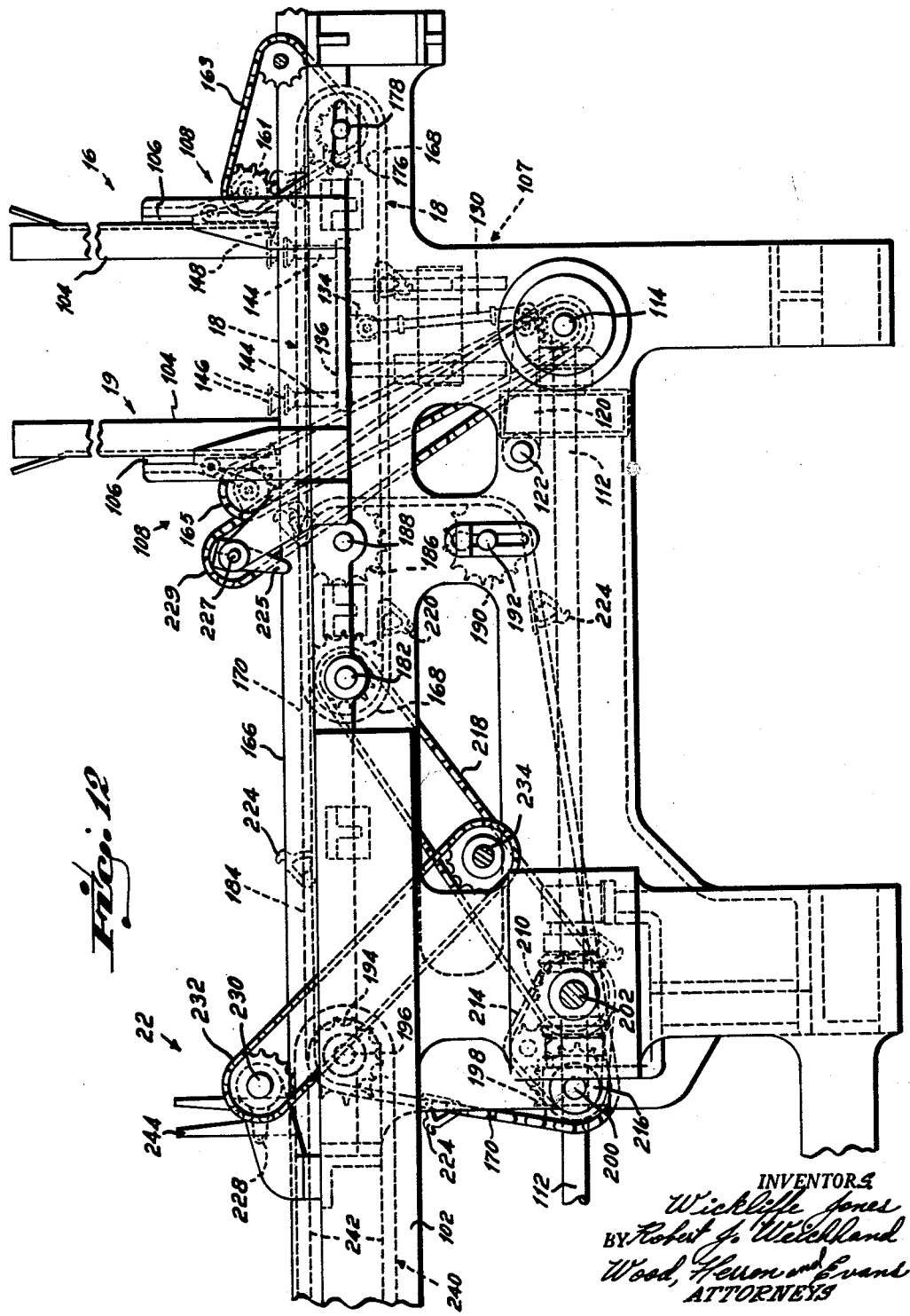

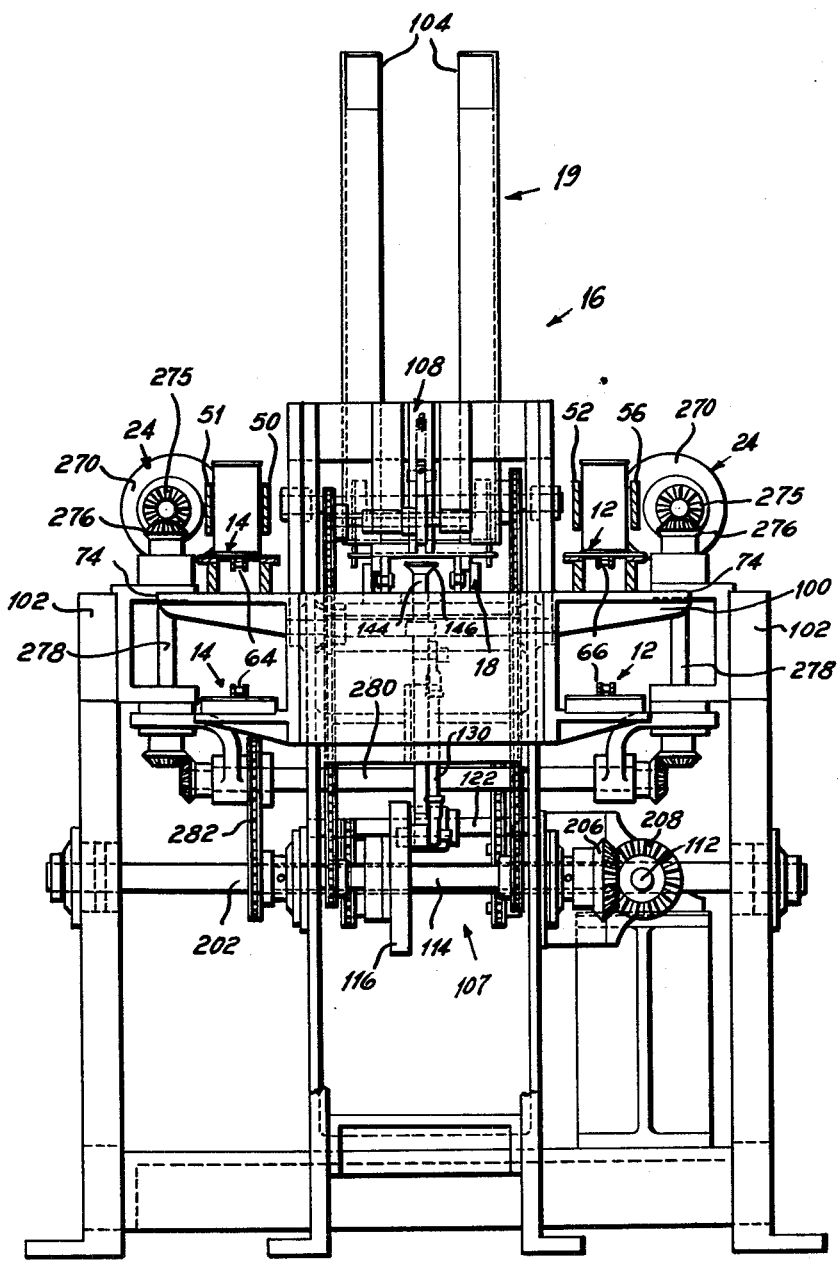

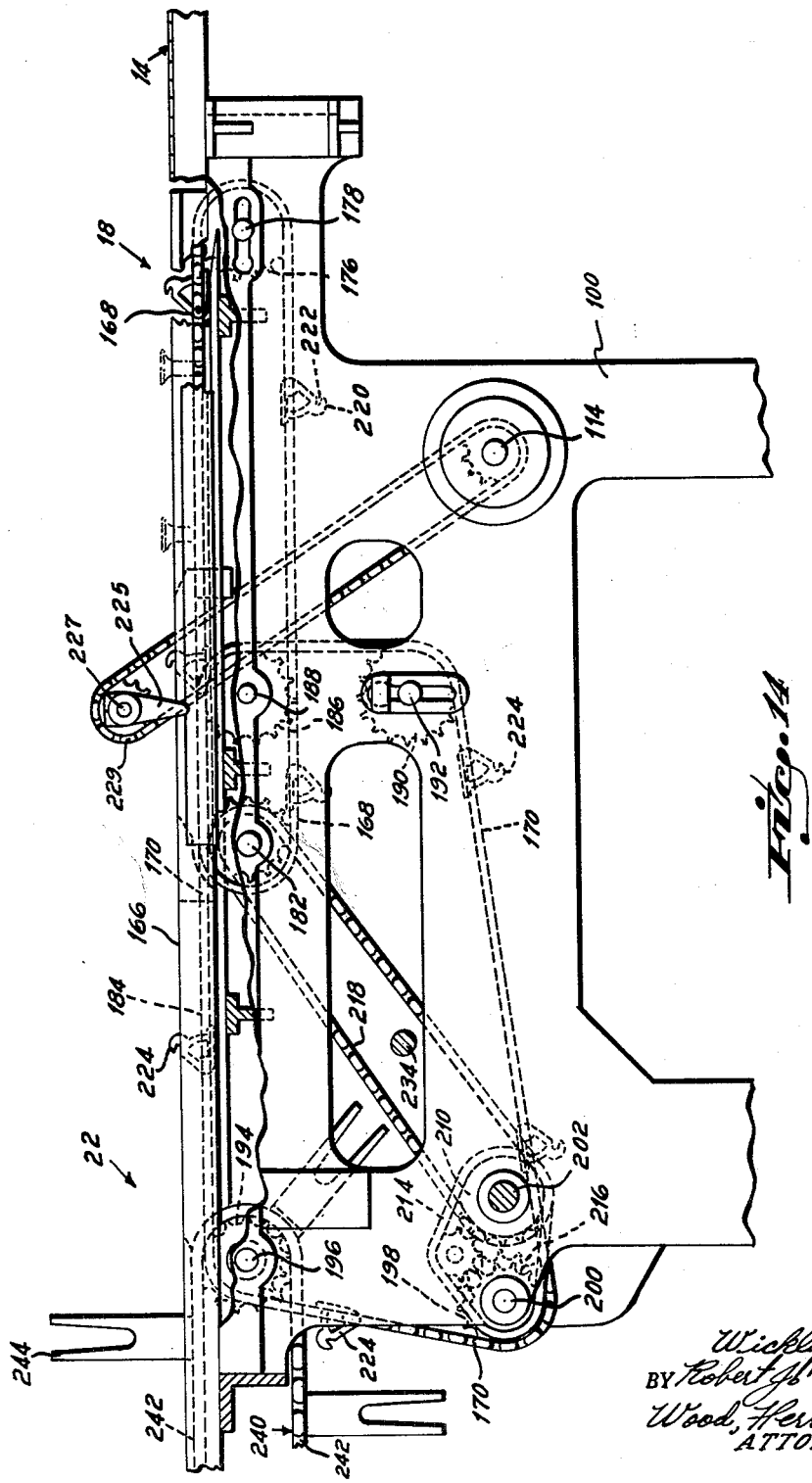

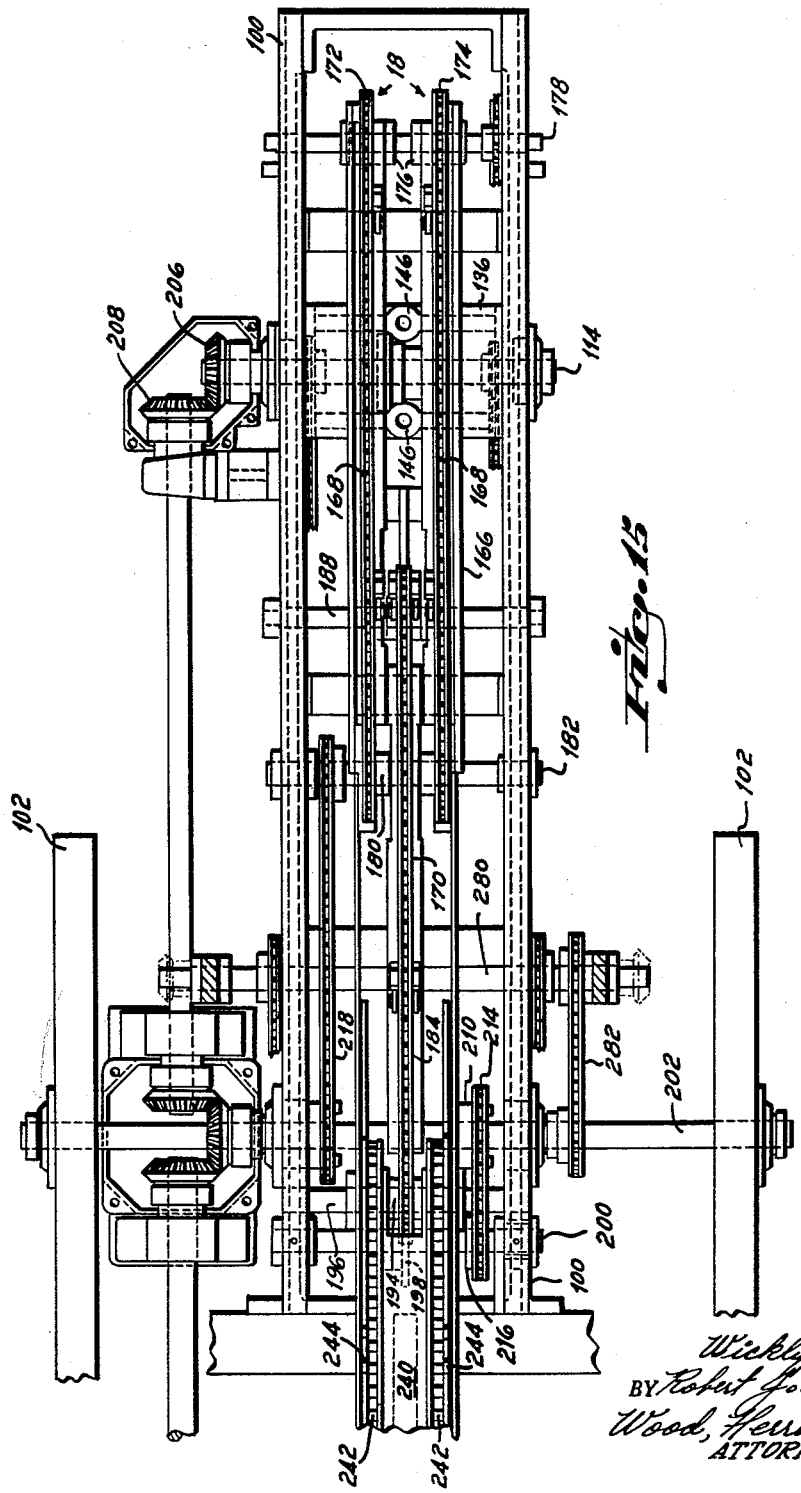

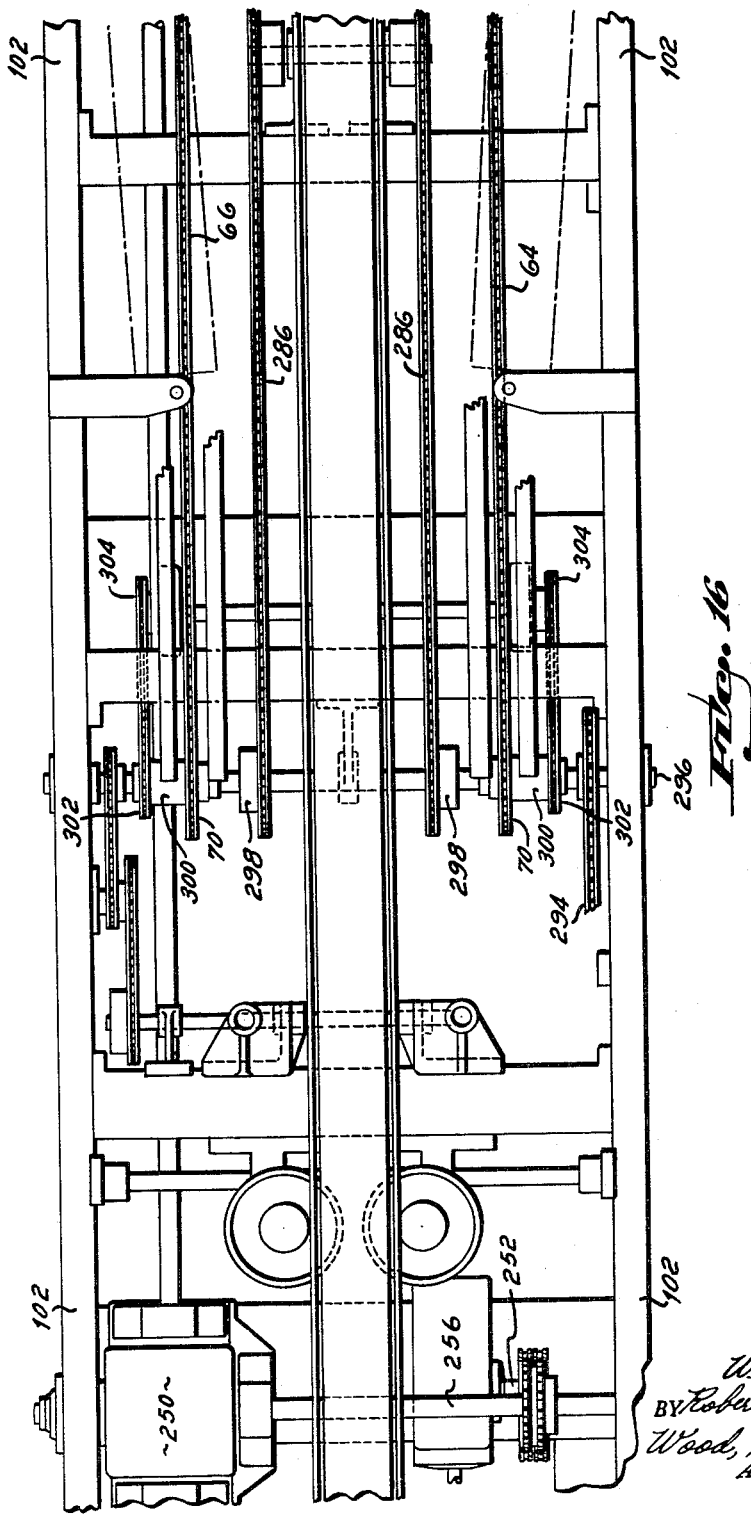

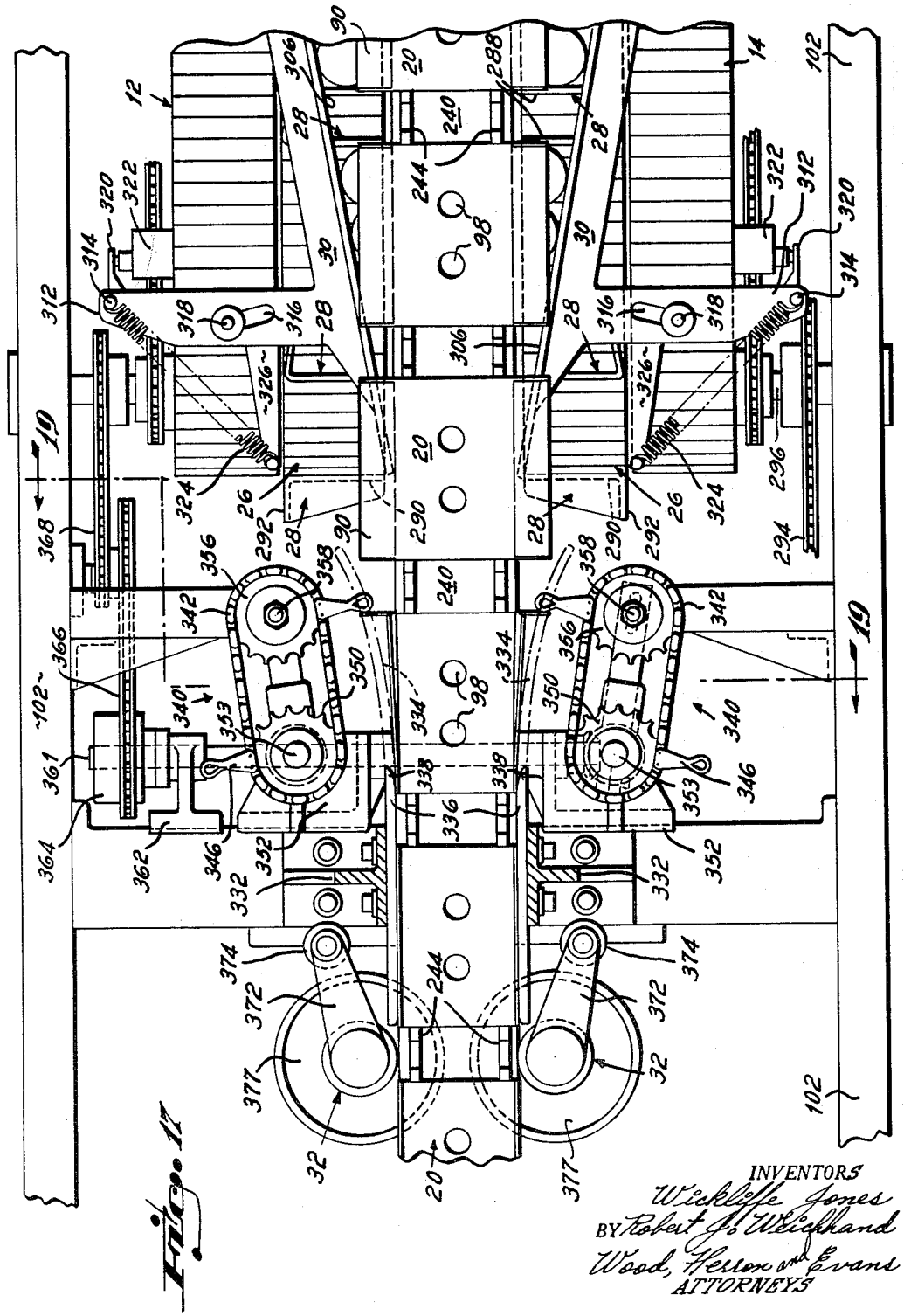

INVENTORS
Wickliffe Jones
Robert J. Weichhand
BY
Wood, Herron and Evans
ATTORNEYS

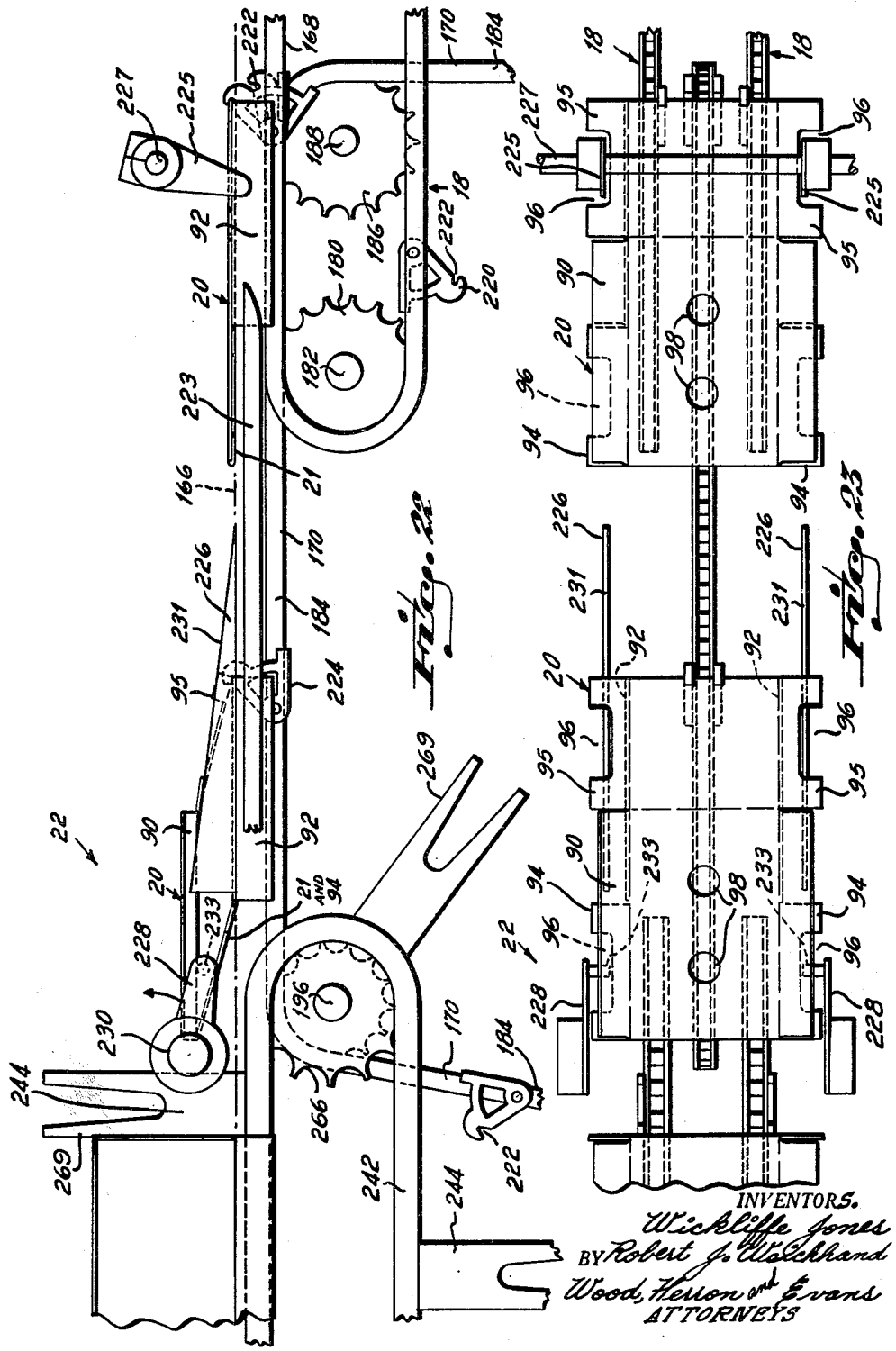

United States Patent Office 3,174,259
Patented Mar. 23, 1965

3,174,259
ARTICLE CARTONING MACHINE
Wickliffe Jones, Cincinnati, Ohio, and Robert J. Weichhand, Covington, Ky., assignors to R. A. Jones and Company, Inc., Covington, Ky., a corporation of Kentucky
Filed Nov. 16, 1961, Ser. No. 152,844
18 Claims. (Cl. 53—48)

This invention relates to a cartoning machine and, more particularly, to a machine for cartoning a package of beer cans. It should be made clear, however, that this invention has application to other cartoning and packaging machines.

It has been an objective of this invention to provide a cartoning machine which is capable of packaging a plurality of articles in a carton or container at a very high rate of speed as, for example, at the rate of 200 cartons per minute.

Another objective of this invention has been to provide a carton feeding and erecting mechanism which is capable of handling the cartons at a very high rate of speed, such as 200 cartons or more per minute, with a minimum of stoppage for correction of jamming, etc.

The present machine is particularly intended for packaging canned goods, such as beer cans, in cartons which are formed of paper board material and which are furnished in a flat collapsed condition. The collapsed cartons are loaded in stacked formation into a magazine which, as explained later, includes mechanism for withdrawing the collapsed cartons individually from the lower portion of the magazine, subsequently to be erected and loaded. In order to obtain the high loading rate, as indicated above, the cans, which are fed in a continuous stream, are segregated into groups and the groups are advanced into the erected carton from opposite ends. After being loaded with the cans, liquid adhesive is applied to the flaps of the cartons, then the flaps are folded to a closed position and sealed before the loaded cartons are discharged from the machine.

Another objective of this invention has been to provide a continuous flow packaging machine which is completely automatic and requires no operator attendance.

In perfecting a cartoning machine which would operate at the speeds of this machine and would handle 1,200 or more cans per minute and package them completely automatically, it was recognized that the articles to be packaged would have to flow in a substantially straight line continuous movement without any stopping or starting. Additionally, the carton erection mechanism could not consist of abrupt impact reciprocating or oscillating erectors as has been conventional in the packaging art, because the speed and momentum of these elements when they struck the carton at the speed necessary to run the machine at this rate, would either cause the carton to tear or would cause the carton to wrap itself around the striking member rather than erect in the manner in which the carton was designed. It has thus been a further object of this invention to provide a cartoning machine which utilizes substantially straight line continuous flow of the articles to be packaged and which eliminates abrupt impact reciprocating or oscillating elements to cause the erection of the carton.

According to this aspect of the invention, the machine includes a series of continuous motion conveyor systems for advancing and erecting the cartons after they are withdrawn individually from the magazine. Thus, the first conveyor apparatus receives the carton blank as it is withdrawn from the bottom of the magazine and includes means for handling the flaps which project outwardly from the opposite open ends of the advancing blank. The first stage conveyor apparatus advances the blank toward a main carton transport conveyor and concurrently partially erects the carton. The partially erected carton is then transferred to the main carton conveyor and, during transfer is completely erected by continuously advancing spacer lugs of the main carton transport conveyor, which coact with the first stage conveyor apparatus. The spacer lugs of the main conveyor confine the carton firmly in its erected condition and advance it toward the can loading zone with the several carton flaps extended outwardly to an open position to avoid any interference with the cans as they are advanced into the open ends of the erected carton.

As the erected carton advances to the loading zone, six cans are fed laterally from a pair of parallel can conveyors into the opposite ends of the carton by stationary converging guide rails. The cans are segregated into groups of three each and fed into the carton by means of rotating feed shafts, each shaft having a helical vane of increasing width which engages the cans as they advance on the can conveyor belt. After the cans are loaded into the carton, liquid adhesive is supplied to the flaps and the flaps are folded to a closed position and sealed as the carton advances toward the discharge end of the machine.

A further objective of the invention has been to provide an improved feed screw for segregating the cans into groups while advancing the cans toward the loading zone, where the segregated groups are fed transversely into the opposite open ends of the advancing carton.

According to this aspect of the invention, the rotating feed screws, which are mounted upon axes which converge toward one another in the downstream direction, are provided with helical vanes which increase in width from the upstream end of each feed screw toward the downstream end. The solid streams of cans are advanced toward the feed screws by a pair of can conveyors located on opposite sides of the main carton conveyor and communicating with the upstream ends of the feed screws. Upon reaching the upstream ends of the converging feed screws, the solid rows of cans on opposite sides are segregated into groups of three each by the narrow leading end of the spiral vane.

During downstream advancement of the groups by the helical vanes, the increasing width of the spiral vanes causes the segregated groups of cans to be progressively separated from one another, such that each separated group advances in endwise alignment with the opposite ends of the respective cartons on the main conveyor. Concurrently, the segregated groups of cans are advanced laterally into the opposite end of the advancing cartons by the converging guide rails, as noted above.

The machine can best be further described with references to the drawings in which:

FIGURE 1 is a perspective view of a portion of the machine showing the carton feeding and erection section of the machine;

FIGURE 2 is a perspective view of a portion of the machine showing the carton loading and closing portion of the machine;

FIGURES 3, 4, 5 and 6 are fragmentary side elevational views in end-to-end relationship, showing the overall machine;

FIGURES 7 and 8 are fragmentary top plan views of the can conveyor and carton erection portion of the machine also in end-to-end relationship;

FIGURE 9 is a top plan view with a portion cut away to show the carton erection drive system of the machine;

FIGURE 10 is a top plan view of the discharge end of the machine;

FIGURE 11 is a fragmentary side elevation of the helical vane, can feeding screw and bucket conveyor system of the machine;

FIGURE 12 is a side elevation of the carton discharge and erection portion of the machine, showing the conveyor driving system for the carton discharge and erection system;

FIGURE 13 is a cross-sectional view of the machine taken along the line 13—13 of FIGURE 8;

FIGURE 14 is a side elevation of the carton erection portion of the machine showing the carton conveyor drive system;

FIGURE 15 is a top elevational view of the carton discharge and erection drive system shown in FIGURE 12;

FIGURE 16 is a top plan elevation of the conveyor drive system at the carton loading section of the machine;

FIGURE 17 is a top elevational view of the carton loading and closing section of the machine;

FIGURE 22 is a diagrammatic side elevational view of the carton erection mechanism;

FIGURE 23 is a top elevational view of the carton erection mechanism as projected from FIGURE 22.

General arrangement and operation

Figure 18:
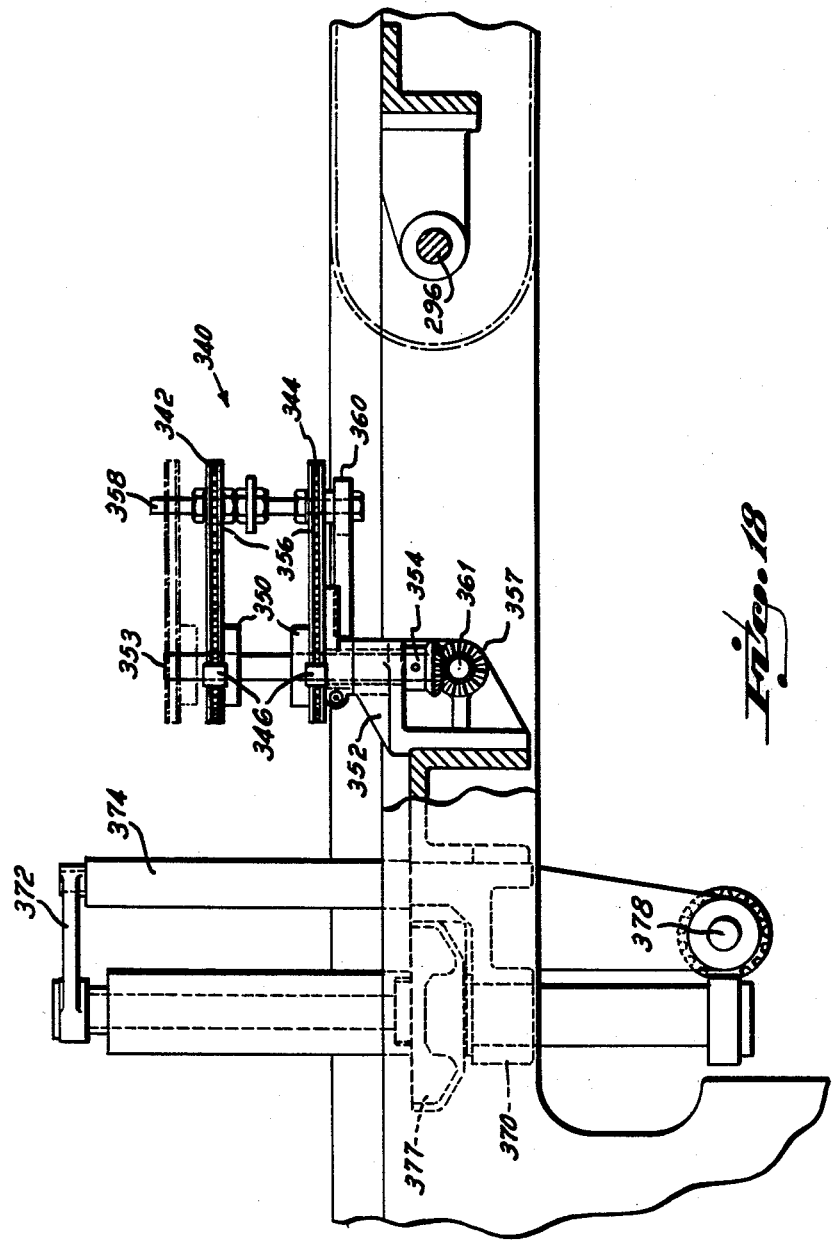
FIGURE 18 is a side elevational view, partially broken away, at the carton closing section of the machine.
Figure 19:
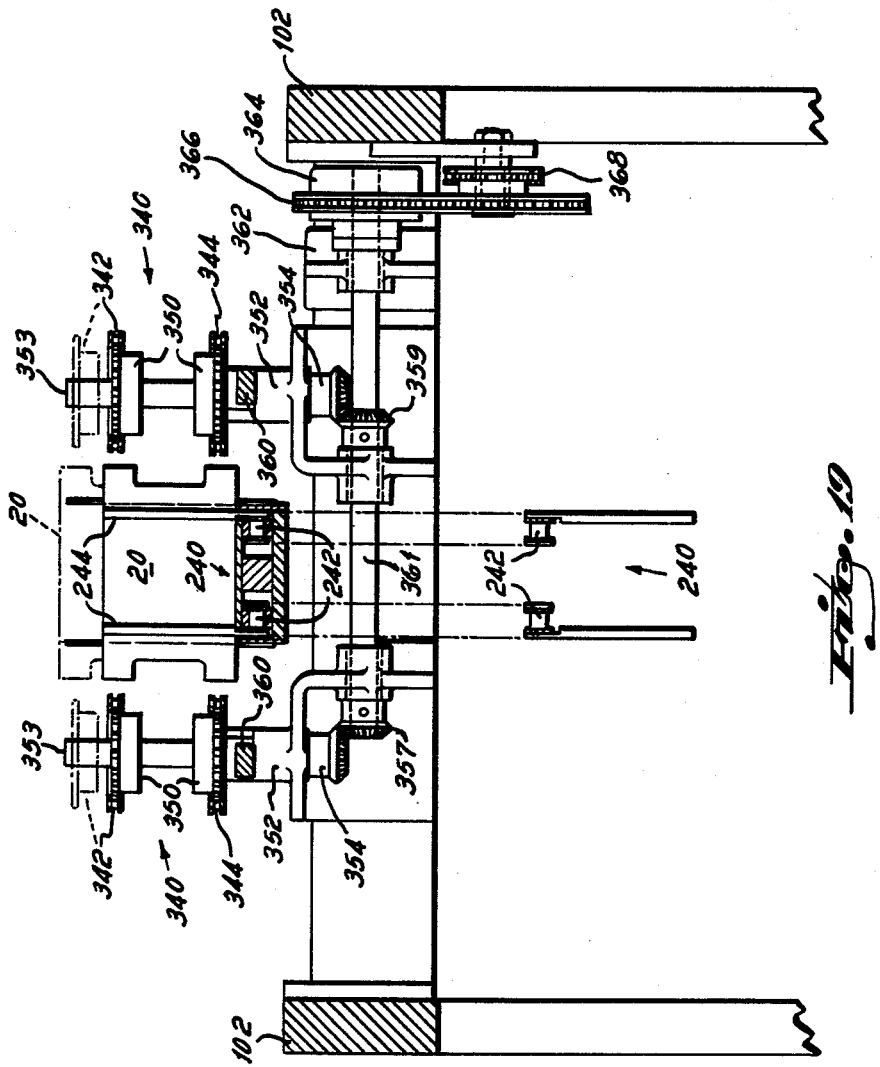
FIGURE 19 is a cross sectional view taken along the line 19—19 of FIGURE 17.

Referring to the drawings, FIGURES 3 through 6 which show a side elevation of the machine and FIGURES 7 through 10 which show a top elevation of the machine, best illustrate the general organization of this cartoner and will be referred to primarily in describing its principles of operation. The individual component sections of the machine are described later with reference to the detailed views of the several component mechanisms.

As indicated by the heavy arrows in FIGURES 7 and 8, the cans to be packed flow from a single line can infeed conveyor 10 onto two parallel line can conveyors 12 and 14. The parallel line can conveyors 12, 14 pass on opposite sides of a carton feeding mechanism indicated generally at 16 (FIGURE 8). The carton feeder 16 consists of a hopper 19 and discharge mechanism which feeds flat cartons onto a carton conveyor system indicated generally at 18. The carton conveyor system 18 and can conveyors 12, 14 move in the same directions with the can conveyors 12, 14 being located on opposite sides of the carton conveyor system 18.

Figure 20:
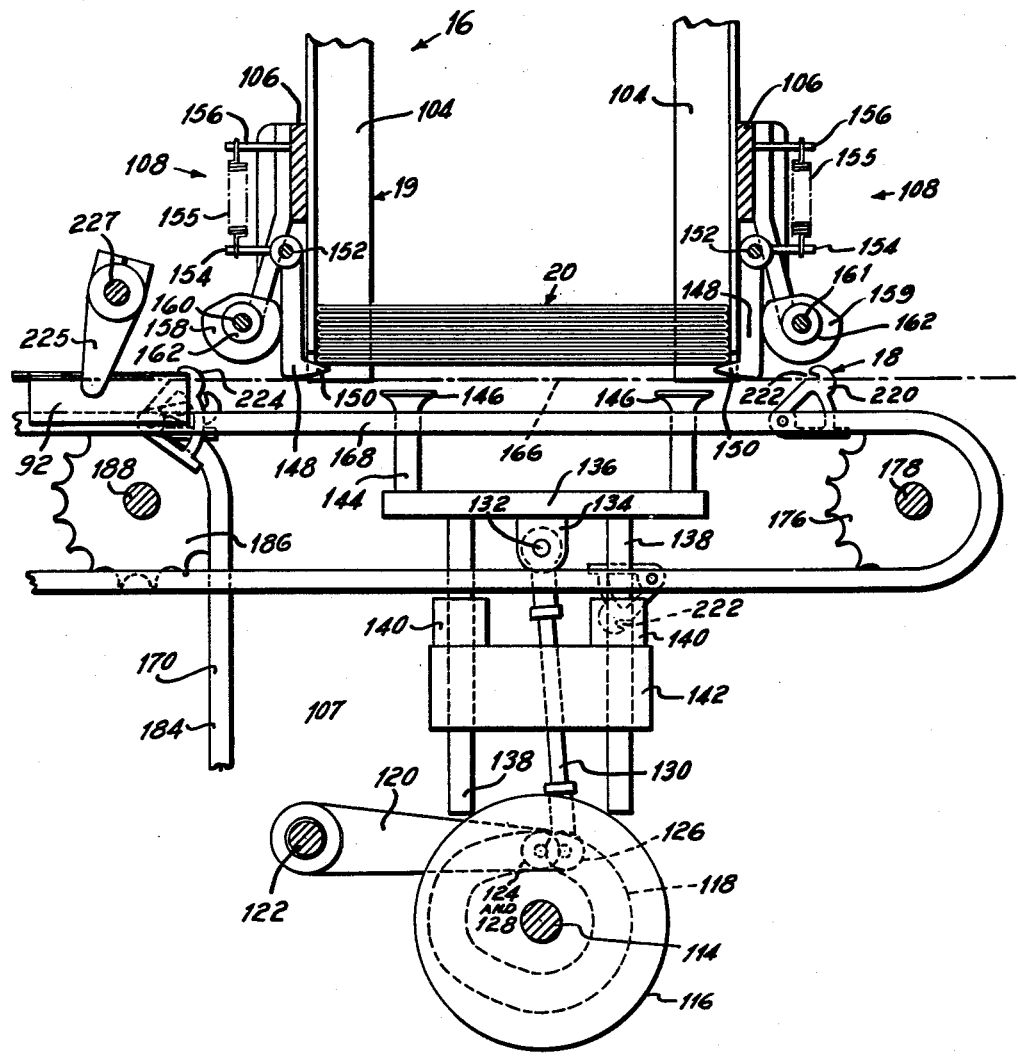
FIGURES 20 and 21 are diagrammatic drawings of the carton feeding mechanism in two different positions.
Figure 21:
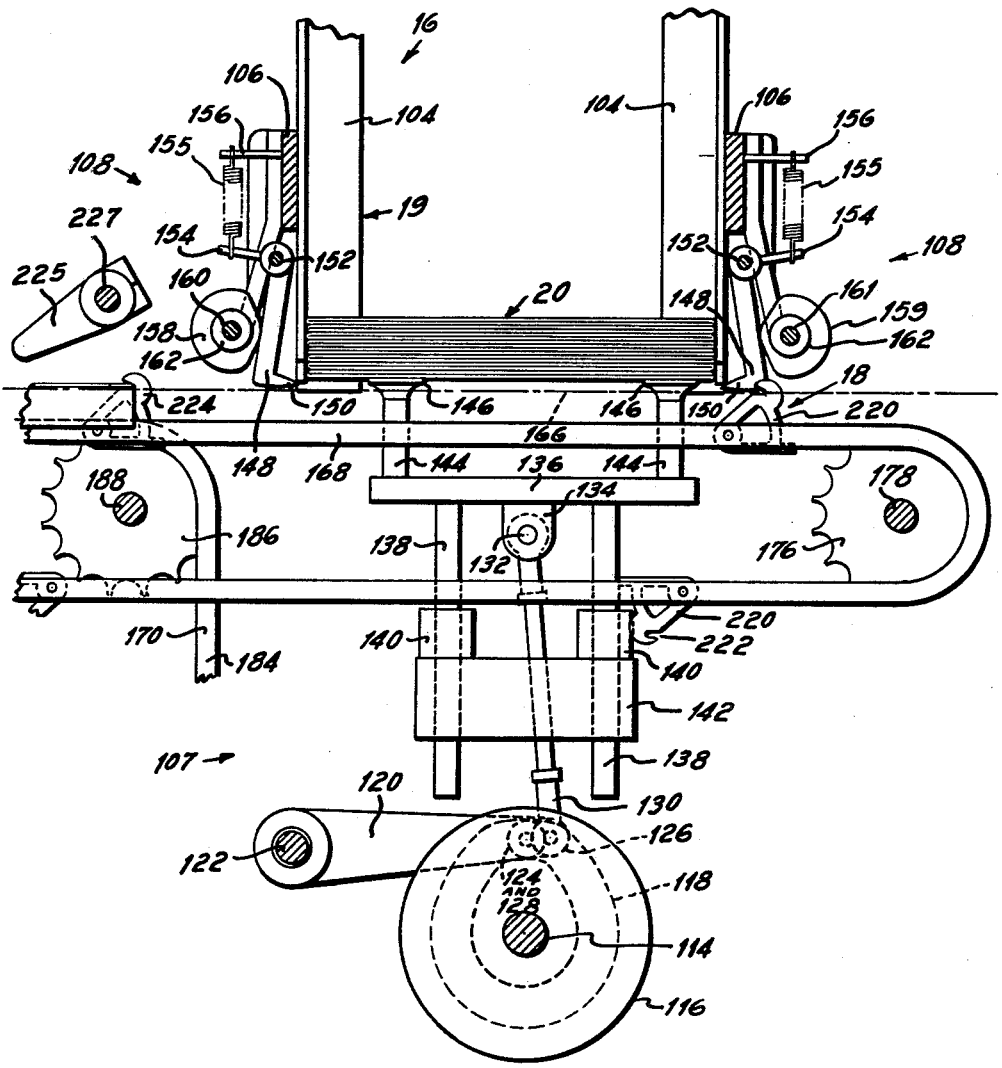

The cartons utilized in this machine are the conventional six-pack beer containers which, when placed in the hopper of the carton feeding mechanism 16 are of preformed shape and have the conventional fold lines but are in the flat condition. The cartons are placed in the hopper in collapsed condition to be erected during continuous advancement of the carton toward the carton loading section of the machine. As shown in FIGURES 20 and 21, the collapsed cartons are withdrawn from the bottom of the stack one at a time and placed on the carton conveyor 18. As the cartons move continuously down the carton conveyor line they are erected by an erecting mechanism 22 (FIGURES 22 and 23). The erected cartons continue to move down the carton conveyor line to the loading section of the machine where a segregated group of three cans are fed laterally into both open sides of the erected carton.

Before being fed into the carton the beer cans must be segregated into groups of three. The segregating mechanism of this machine consists of two feed screws 24 located on the outside of each of the can conveyors and on an axis which crosses the can conveyors. Each of these screws 24 has a spiral vane thereon which is of increasing width as it progresses toward the discharge end of the line. The lead of these spiral vanes is equivalent to the width or diameter of three cans. The screws 24 also serve to force the segregated groups of cans off of the can conveyors 12, 14 and onto bucket conveyors 26. The bucket conveyors 26 each have a plurality of spacers 28 thereon which maintain the segregated groups of cans in the proper number segregated groups to be loaded into each side of the open carton.

As the groups of cans are forced toward the discharge end of the machine by the bucket conveyors, the cans are forced off of the bucket conveyors 26 by guide rails 30 which extend across the top of the bucket conveyors and are inclined toward the discharge end of the machine. These guide rails force the segregated groups of cans into the open sides of the carton in groups of three.

With the cans located within the carton, the front and rear side flaps of the carton are folded inwardly and have glue placed thereon by a conventional glue roller 32. Thereafter, the top and bottom side flaps are folded downwardly and upwardly respectively over the front and rear side flaps and the carton is thus sealed. The cartons continue out of the machine past a speed belt arrangement 34 which pulls the cartons off of the main conveyor and out of the machine.

It should be noted that the machine is arranged for continuous feeding so that there is no intermittent stopping and starting of either the cartons or the beer cans as they proceed down the various conveyors. This has been found to be a very advantageous and possibly absolutely necessary arrangement when the machine is operated at the speeds for which this machine is designed, for example, 200 cartons per minute.

Can feeding and conveyor mechanism

Cans are fed to the two can conveyor lines 12 and 14 of the cartoning machine from the single line in-feed conveyor 10. The in-feed conveyor 10 consists of a conventional endless chain 36 having transverse plates 38 mounted upon each of the links. The can conveyor 10 is mounted upon a frame 40 which also carries the drive mechanism 42 for the conveyor 10. The drive to the in-feed conveyor 10 is from an idler shaft 43 which is driven by the can conveyor 14 through a conventional chain and sprocket drive 45 and a connecting shaft 47, to the in-feed conveyor drive shaft 49.

The main in-feed conveyor 10 is mounted normal to the two can conveyors 12, 14. Two guide rails 46, 48 are connected to the frame 40 and extend parallel to the length of the chain conveyor 10. These guide rails 46, 48 are connected by means of arcuate guide rail sections to the guide rails 50, 51 of the can conveyor 14 and through a single arcuate section of guide rail 54 to the inside guide rail 52 of the conveyor 12. The outside guide rail 56 of the conveyor 12 extends up to and beneath the star wheel 44 but has no arcuate section therein.

The star wheel 44 is journaled upon a shaft 58 and is driven in rotation by the cans being conveyed along the conveyor 10. The star wheel is mounted above the conveyors 10 and 12 at the point of junction there between in such a manner that the periphery thereof extends to a point approximately half way across each of these conveyors 10 and 12. The periphery of the star wheel has an even numbered plurality of arcuate recesses 60 therein which are adapted to receive and regulate the number of cans which pass from the conveyor 10 onto the conveyors 12 and 14. Beneath alternate arcuate recesses 60 are arcuate permanent magnets 62. These permanent magnets serve to attract and hold every other can in the recesses 60 so that as the star wheel rotates, every other can passes onto the conveyor 12 while those which are received in the recesses which have no magnets adjacent thereto, continue on down the conveyor 10 onto the conveyor 14. The star wheel 44 rotates at a linear speed somewhat slower than the linear speed of the conveyor 10 so that the cans stack up behind the star wheel and thus insure that the same number of cans pass on to the conveyor 12 and 14.

Can conveyors 12 and 14 of the cartoning machine extend nearly the full length of the machine up to the point where the cans are loaded into the cartons 20. The conveyors 12 and 14 are of the chain type and have plates mounted upon each link in the same manner as the conveyor 170. These chains 64, 66 ride over sprocket wheels 68 at the rear of the machine and are driven from sprocket wheels 70 at the front of the machine. The sprockets 70 are driven by a constant speed auxiliary motor 72 (FIGURE 5) as will be more fully explained hereinafter.

Mounted on a frame 74 which supports the can conveyors 12 and 14 are three switches 76, 78 and 80. These switches are all normally closed and spaced longitudinally along the can conveyor 14. Each of these switches includes a switch actuating bar 82 which extends over the line of cans progressing down the conveyor in a position to be engaged by the cans as they move along the conveyor. The first of these switches 76 is a minimum prime switch. This switch is nearest the output end of the machine and is spaced rearwardly from the screw 24 which segregates the can into groups of three. It controls the carton feeding mechanism and the flow of cams along the conveyor. Thus, so long as this switch is held in the open position by cans progressing thereby and stacked up to a point beyond the switch 76, the cartons will continue to be fed into the machine from the hopper. If, however, the minimum prime switch 76 should be closed for lack of cans stacked up to a point back to this switch, the carton feed mechanism 16 will be caused to stop feeding cartons onto the conveyor. This is achieved by shutting off a vacuum through a conventional valve (not shown) to the carton separating suction cup mechanism as is more fully explained hereinafter. Additionally, lack of cartons on the carton conveyor will trip a switch (not shown) to cause lever bars 83 (FIGURE 1) to be inserted between the cans on the conveyors 12 and 14 at a point indicated generally by heavy arrows 84 (FIGURE 9) to block the flow of cans into the machine. The lever bars 83 are operated by conventional electrical solenoids 85. Thus, so long as cans are stacked up behind the switch 76, the machine will continue to operate normally. However, should this switch be opened by lack of cans flowing thereby, the carton flow will be stopped and the cans will be stopped at the point indicated at 84 while those cans which are in the machine and past the lever bar 83 will continue to be fed into their respective cartons and out of the machine. The purpose of this arrangement is to prevent any cartons from being stopped in mid process after having had glue applied thereto in which event the glue would dry without the carton having been properly sealed.

The switch 78 is a medium speed control switch. Thus if the cans are stacked up in the machine back to the switch so as to maintain it in the open position, it will, through conventional circuitry, cause a variable speed main drive motor 110 to be driven at fifty percent of full operating speed. In much the same manner, the switch 80 is a speed control switch which, when the cans are stacked up on the can conveyors 12 and 14 back to the switch 80, will cause the motor 110 to drive the machine at full flow capacity.

*Carton handling and erecting mechanism*

This machine is designed for continuous operation and specifically for the packaging of six beer cans within each carton as the cartons move continuously through the machine. The machine is designed to handle two hundred cartons per minute which would be nearly impossible if the carton had to be set up or erected manually. Therefore, this machine includes a carton feeding and erecting mechanism which will handle the cartons at this rate. However, it should be obvious that this carton handling and erecting mechanism could be utilized in other and different combinations with different type cartons for packaging other types of products.

Referring to FIGURE 23, wherein there is shown an enlarged view of the cartons in the flat position, it will be seen that the particular cartons utilized in this cartoning machine for this particular application, consists of a flat container formed into a closed loop and having the conventional fold lines thereon to form the top and bottom and sidewalls of the erected carton.

This carton also has the usual top side flaps 90, bottom side flaps 92, front side flaps 94 and rear side flaps 95. Each of the front and rear flaps 94, 95 has a lateral recess 96 therein. In the top each carton has the usual finger holes 98 therein by which the filled carton is adapted to be lifted and carried.

The carton feeding and erecting mechanism is mounted upon a separate frame 100 (FIGURE 8) which is received between the can conveyors 12 and 14 and abuts against the end of a can handling and carton filling frame 102 of the machine.

Referring to FIGURES 20, 21, 22 and 23, it will be seen that the flat cartons are stored in the hopper 19 and gravity fed therefrom. The hopper 19 consists of four right angle posts 104 which extend vertically from the frame 100 and are rigidly connected thereto. These posts each receive one corner of the flat container. The posts are each connected to the frame member by horizontal beams 106 (FIGURES 8 and 20).

The bottom carton of the stack in the hopper is separated from the stack by means of a cam operated suction mechanism 107 operating in conjunction with cam operated detent mechanisms 108. The separated carton is then engaged by the carton conveyor 18 and removed from the hopper.

The cam operated suction mechanism is driven by the variable speed motor 110 (FIGURE 5) via the main cycle shaft 112 which extends approximately the full length of the machine, and a horizontal operating shaft 114. The horizontal operating shaft 114 has a circular cam 116 rigidly mounted thereon or keyed thereto which causes the reciprocation of the suction mechanism. Cam 116 has an eccentric oval cam track 118 in one of its radial faces. A cam follower arm 120 is pivotally mounted on a shaft 122 and has two lateral protrusions 124, 126 extending from the opposite sides thereof at the end opposite the end which is mounted upon the shaft 122. A rotary cam follower 128 is mounted upon the protrusions 124 and extends into the cam track 118. The other protrusion 126 has one end of a crank arm 130 pivotally journaled thereon and extending upwardly therefrom. The opposite end of the crank arm 130 is pivotally connected to a pin 132 which extends between two parallel downwardly extending tabs 134 of a suction cup mounting plate 136. Thus, as the shaft 114 and the cam 116 are driven in rotation, the rotary movement of the cam is translated into reciprocating movement of the suction cup mounting plate 136.

The suction cup mounting plate 136 has two vertical posts 138 extending downwardly therefrom. The posts 138 are mounted for vertical reciprocation in the bearings 140 which are rigidly mounted upon a support member 142. Support member 142 is rigidly connected to the carton feeding and erecting frame 100. Extending vertically upwardly from the top surface of the mounting plate 136 are two posts 144 which have suction cups 146 connected to the top surface. These suction cups are adapted to engage the lowermost flat carton 20 in the hopper 19 in the uppermost position of the suction cup mounting plate.

The cartons in the hopper 19 must be supported on their lowermost surface in order to prevent the whole stack of cartons from falling uncontrollably through the hopper. In this connection, a pair of longitudinally extending support rails 166 are located below the bottom of the posts 104 so that a vertical gap exists between the bottoms of the posts 104 and the top of the support rails 166. The cartons in the hopper rest upon these support rails which are spaced laterally from the carton conveyor 18.

The cam operated detent mechanisms 108 which cooperate with the suction cup mechanisms to separate the lowermost carton from the other cartons in the stack so that it may be removed from the hopper by the carton conveyor, include two pivotally mounted detent fingers 148. These fingers extend generally vertically and have an inwardly directed, pointed, spacer portion 150 at their lowermost ends. The pivotal mounting for each of these fingers consist of fixedly mounted horizontal shafts 152 on opposite sides of the hopper. On each of the fingers 148, there is an extension member 154 protruding outwardly at the end opposite the support portion 150 and in a direction opposite to the protrusion 150. Each of the extension members has one end of a compression spring 155 connected thereto with the opposite end of the compression spring being connected to a fixed post 156 so that the springs always tend to bias the spacer portions 150 of the fingers into a position away from the cartons.

The oscillation of the detent fingers 148 is limited in a direction away from the cartons by cams 158, 159. The cams 158, 159 are mounted upon cam shafts 160, 161 respectively. Each of these cam shafts is rotatably journaled in a portion 162 of the frame member 100. The cam shaft 161 is driven by a conventional chain and sprocket mechanism 163 from a conveyor idler shaft 178 while the cam (FIGURE 12) shaft 160 is driven by a chain and sprocket mechanism 165 from the horizontal operating shaft 114.

As the cams 158, 159 rotate they cooperate with the springs 155 to cause the oscillation of the detent fingers 148 from a position beneath the cartons to a position out of engagement with the lowermost carton. With each revolution of the cam shafts, the detent fingers pass through one oscillating stroke and allow one carton to be separated from the stack and placed in a position to be carried on down the machine by the carton conveyor mechanism.

Referring to FIGURES 20 and 21, it will be seen that as the suction cup mounting plate 136 moves from a high position in which the suction cups 146 are engaged with the bottom sides of the lowest flat carton, to a lower position, the detent fingers 148 oscillate from a position out of engagement with the lowermost carton to a position beneath the second carton in the stack. As the suction cups engage the lowermost carton and start to bow it in the center by pulling the center portion downwardly between the support rails 166, the fingers are disengaged from the lowermost carton. The detent fingers enter the gap created by the bowing of the lowermost carton as it is pulled downwardly by the suction cups to maintain a positive separation between the bowed lowermost carton and the other cartons in the stack. After the detent fingers enter the gap between the cartons, the suction cups are disengaged from the lowermost carton. If the suction cups were not disengaged from the separated carton prior to its removal from the hopper by the carton conveyor 18, the bottom of the carton would be scarred or torn by the carton moving across the suction cups. The separated carton is removed from the hopper by driving lugs on the carton conveyor 18 which enter the gap between the cartons and push the lowermost carton out of the hopper.

*Carton conveyor system and erection mechanism*

Referring to FIGURES 12, 13, 14 and 15, it will be seen that the carton conveyor system comprises two separate conveyors 168 and 170. Referring to FIGURE 15, the first conveyor 168 comprises two endless chains 172, 174. Each of these chains is supported in the rear by sprockets 176 which are mounted upon a horizontal conveyor idler shaft 178 at a point behind the carton feeder mechanism. In the front, each of these chains is supported on sprockets 180 which are rigidly connected to a horizontal driving shaft 182.

The second carton conveyor 170 consists of a single endless chain conveyor 184 which is located in a vertical plane midway between the two chain conveyors 172, 174 of the first carton moving conveyor 168. At the rear, chain conveyor 184 passes over an upper sprocket 186 which is mounted upon a horizontal idler shaft 188 and over a lower sprocket 190 which is mounted upon an idler shaft 192 (FIGURE 12). The rear idler shafts 188, 192 are located in the same vertical plane and are spaced rearwardly from the horizontal driving shaft 182 of the carton conveyor 168. At the front, chain conveyor 184 passes over sprocket 194 which is mounted upon a horizontal idler shaft 196 and at the bottom passes over a sprocket 198 which is fixed to a horizontal driving shaft 200.

Referring to FIGURES 12, 13 and 14, it will be seen that the drive system to the carton feeding and conveyor mechanism is from the variable speed motor 110 thru the main cycle shaft 112 to a conveyor power shaft 202 (FIGURE 12) thru conventional bevel gearing. The main cycle shaft 112 is also connected thru conventional beveled gearing arrangements 206, 208 to the operating shaft 114 so as to drive this shaft in synchronization with the main cycle drive shaft and all the mechanism driven thereby.

The conveyor power shaft 202 has a sprocket 210 rigidly mounted thereon which drives a chain 214. The chain 214 in turn drives a sprocket 216 on driving shaft 200 so as to provide a drive system to the second carton conveyor 170. The conveyor power shaft 202 is also connected by a chain drive 218 to the drive shaft 182 so that it also drives the first carton conveyor 168.

Each of the chains 172, 174 of the first carton conveyor 168 has a plurality of generally triangular shaped driving lugs 220 mounted thereon. Each of these driving lugs has a carton receiving slot or recess 222 in its top edge on the leading side. These recesses extend horizontally when the lugs are located on the top portion of the chain in a position to engage and push the cartons and are in the same general horizontal plane as the top surface of the support rails 166. The lugs 220 on the chains 172 and 174 are located in parallel positions on each of these chains so that they run in pairs. Thus one lug on each chain would engage the rear edge of a carton simultaneously.

The second carton conveyor 170 has a plurality of driving lugs 224 mounted thereon. The lugs 224 are of the same shape and contour as the lugs 220 on the conveyor 168. However, on the conveyor 170 there are a plurality of pairs of lugs 224 mounted upon the chain 184 with each one of a pair being attached to the opposite sides of the chain.

Referring to FIGURE 12, it will be seen that the lugs 220 on the first carton conveyor 168 push the carton away from beneath the hopper 18 and force it to the end of this conveyor whereupon the lugs of the second carton conveyor 170 take over and continue to push the carton to the end of this conveyor. During the time that the carton moves down the carton conveyors 168 and 170, the erection of the carton takes place.

A pair of bottom flap folding cams or fingers 225 (FIGURES 22 and 23) are mounted above the first carton conveyor 168 at a point slightly forward of the carton hopper 19. These cam fingers 225 are mounted upon a shaft 227 which is journaled in journal blocks on the frame 100, and is driven by a chain and sprocket arrangement 229 (FIGURE 12) from the power shaft 114.

These bottom flap folding cams 225 operate in time sequence with the carton conveyor and feeder mechanism to fold down the bottom side flaps of the cartons as they are pushed beneath the fingers by the carton conveyor 168. Thus as the flat cartons pass beneath these cams which rotate in a clock-wise direction as viewed in FIGURE 22, the ends of the cam fingers pass thru the recesses 96 in the rear side flaps 95 to engage the top of the bottom side flaps 92 and force them downwardly to the position shown in FIGURE 22. As the carton continues down the conveyor, hold down strips 223 which are mounted outside the chain conveyors, engage and hold the bottom side flaps in a downwardly extending direction against the outside vertical surface of the rail supports 166. As the cartons continue moving along the carton conveyors, the front edges 21 of the cartons engage two opening strips 226 which are mounted on the frame 100 on opposite sides of the carton conveyor 170. The top surfaces 231 of the opening strips 226 are parallel and inclined upwardly and forwardly. As the leading edges 21 of the cartons are forced up the top inclined surfaces 231 of the opening strips 226, the cartons begin to erect since the bottom side flaps are held in a horizontal position between the hold down strips 223 and the support rails 166. With the bottom side flaps of the flat carton in the rear and held in a fixed horizontal plane while the leading edge of the front side and top are forced upwardly by the inclined surface 231, the carton must open. The inclined surface 231 terminates at a point where the carton is approximately one-third open or erected.

The carton erection is completed by two top flap engaging fingers 228. Both of the fingers 228 are mounted upon a shaft 230 above the carton conveyors at a point spaced laterally beyond the sides of the carton. The shaft 230 extends transversely across the carton conveyors with the fingers 228 extending radially from the shaft. Each finger 228 has a protrusion 233 extending inwardly from its end in a position to engage the lateral edge of the carton. The shaft 230 which drives the top flap engaging fingers 228 in rotation, is driven by a chain and sprocket arrangement 232 (FIGURE 12) which is in turn driven from a shaft 234. Shaft 234 is likewise driven by a chain and sprocket arrangement (not shown) from main cycle shaft 112 so that the top flap engaging fingers 228 are, as a result, driven in synchronization with the other components of the carton feeding and erecting mechanism. As the top flap engaging fingers 228 rotate in a counter clockwise direction as viewed in FIGURE 22, the protrusions 233 on the fingers pass thru the lateral recesses 96 in the front side wall flaps 94 to engage the top side wall flap of the carton and force it into a fully erected position. Thus when these protrusions release the top of the carton, the carton is fully erected.

*Main carton transport conveyor and carton filling mechanism*

The main carton transport conveyor 240 consists of a double endless chain conveyor which transports the erected cartons to the filling mechanism and out of the machine. Each of the chains 242 (FIGURE 15) of the main transport conveyor has a plurality of spacer and divider lugs 244 mounted thereon. The spacer and divider lugs consist of rectangular plates having a V-shaped notch extending downwardly from the top surface. The lugs 244 are mounted upon the two chains at transversely parallel locations so that a lug on each chain will be engaged with each carton. The lugs on each chain are spaced apart a distance equal to the length of the cartons so that there are no void pockets between the lugs and the cartons and each lug has an erected carton abutting against it at both its front and rear vertical surface.

Referring to FIGURES 5 and 6, it will be seen that the drive for the main carton transport conveyor 240 is from the variable speed motor 110 thru a conventional electric clutch 246 and electric brake 248 to a speed reduction transmission 250. From the speed reduction transmission output shaft 252, the power is transferred by a conventional chain and sprocket drive 254 to a transverse horizontal power supply shaft 256 which is connected by conventional bevel gearing 258 to the main cycle shaft 112. The main cycle shaft 112 is connected by a pair of beveled gears to a transverse drive shaft 260. The drive shaft 260 is in turn connected thru appropriate spur gears 261 to a main transport conveyor drive shaft 262. The drive shaft 262 has a pair of sprockets 264 fixedly mounted thereon over which the chains 242 of the main carton transport conveyor 240 pass and by which they are driven. In the rear, chain conveyors 242 each pass over sprockets 266 which are mounted upon the idler shaft 196 (FIGURE 22).

Since the main carton transport conveyor 240 is driven from the main cycle shaft 112 and the carton conveyors 168, 170 are also driven from this shaft, these conveyors all will run in synchronization.

As the lugs 244 of the conveyor 240 move around the rear sprockets 266 in a counter clockwise direction, the leading edges 269 of the lugs engage the trailing transverse edges of a partially opened carton while the leading edges 21 of the partially opened carton move into engagement with the trailing edges of the preceding spacer lugs. With the leading edge of a partially opened carton in abutment with the trailing edges of two spacer lugs 244 and the trailing edge of the same carton in engagement with the leading edges of the two following spacer lugs, the carton is forced into a fully erected position as the spacer lugs which are in engagement with the trailing edge of the carton, move around the idler sprockets 266 and come into the vertical position. In practice it has been found that the top flap engaging fingers 228 are not absolutely necessary to the operation of this machine in order to erect the carton since the spacer lugs 244 will complete the opening of the carton once it has been partially opened by the inclined opening strips 226 and bottom flap control plows 223. However the top flap engaging fingers 228 act as auxiliary openers, to aid the spacer lugs in completely erecting the partially opened carton and to insure that the cartons do not jamb up in the machine.

The erected cartons on the main transport conveyor 240 are held down on the conveyor by a hold down rail 235 (FIGURES 1 and 2) which extends longitudinally over the center of the main transport conveyor. The hold down rail is supported by a supporting arm 236 which is non-rotatably connected to a transversely extending shaft 237. The shaft 237 is pivotaly journaled in an overarm bracket 238 which is rigidly connected to the frame 102. A torsion spring 239 has one end connected to the bracket 238 and the other end connected to the shaft 237 so as to bias the supporting arm 236 into a vertical position in which the hold down rail is in its lowermost position. This supporting arrangement of the hold down rail 235 permits the hold down rail to be pulled upwardly against the spring bias of torsion spring 239 in order to remove cartons manually from the main transport conveyor in the event of a jamb in the machine, etc.

At a point spaced longitudinally forward from the carton erecting conveyors, the feeder screws 24 extend above the can conveyors 12 and 14 and at a slight angle across each of these conveyors. The feeder screws consist of a pair of rotatable screws, each of which has a spiral vane 270 of increasing width thereon. Each of these screws is mounted upon an axis above the conveyors 12 and 14 with the axis of each screw being in a horizontal plane slightly inclined to the direction of movement of the conveyor over which it is mounted.

The vane 270 of each of the screws increases in width from the end which is on the outside or spaced laterally of the conveyors to the opposite end which is located over each of these conveyors. The lead of the spiral vane is approximately three times the diameter of the cans on the conveyor so that the vane will force itself between two adjacent cans and force the cans on the conveyor into groupings of three with each group of three spaced further apart as the groups move forward along the screws. Thus the screws act not only as a feeder screw but additionally, as segregators to group and space the cans for insertion into the cartons. Of course, if the invention were utilized to package fewer or more articles in each carton, the lead on each screw would be modified accordingly to accommodate an appropriate number of articles therein.

The ends of the feed screws are mounted in adjustable bearing blocks for movement laterally relative to the conveyors. The ends of the screws nearest the infeed end of the machine are journaled in adjustable bearing block supporting brackets 272 while the ends of the screws nearest the output end of the machine are journaled in adjustable bearing blocks 274. These bearing blocks are in turn mounted upon the frame 102 of the machine.

The end of the feed screws 24 nearest the input end of the machine, have beveled gears 275 thereon thru which the screws are driven in rotation. These beveled gears in turn mesh with beveled gears 276 on vertical shafts 278. Vertical shafts 278 are in turn driven by a horizontal power feed shaft 280 (FIGURE 13). The power feed shaft 280 is driven thru a conventional chain and sprocket drive 282 from a lower conveyor power feed shaft 202. The conveyor lower power feed shaft 202 is driven thru conventional beveled gearing from the main cycle shaft 112 so that the rotation of the feed screws is synchronized with the operation of the carton feeding mechanism and the conveyors of the machine.

The bucket conveyors 26 are located on both sides of the main carton transport conveyor 240 between the main carton transport conveyor 240 and the can conveyors 12 and 14. The top surfaces of all of these conveyors are located in the same horizontal plane so that cans may pass freely from one conveyor to the other by merely sliding laterally.

The bucket conveyors 26 are each of the same general variety as the can conveyors 12 and 14 in that each is an endless chain type conveyor having a plurality of laterally extending plates mounted upon the links of the chain 286. In addition however, the bucket conveyors have a plurality of spacer brackets 28 mounted on the top surface to maintain the cans in groups of three as they are forced across the bucket conveyors into the cartons. Each of the spacer brackets 28 is split transversely to form two sections with each individual section mounted upon a separate plate of the conveyors 26. Each bracket has two side plate portions 288 which extend upwardly normal to the surface of the plates of the conveyor, a bottom portion 290 which is welded or otherwise connected to the top surface of the links of the conveyor, and an end portion 292 extending between the side sections 288 at the lateral extremities of the sides. The end section tapers backwardly from the leading side plate portion to the rear side plate portion so that the leading side plate portion is slightly longer than the rear side plate portion. The bottoms of the half sections of the spacer brackets are bolted or welded or otherwise connected to two different adjacent plates of the bucket conveyor in order to allow the conveyor to move around the supporting sprockets more easily.

The bucket conveyors 26 are driven from the variable speed motor 110. The drive system is from this motor thru the speed reduction transmission 250 to shaft 256 and from shaft 256 thru a conventional chain and sprocket drive system 294 (FIGURE 5) to the conveyor drive shaft 296. Referring to FIGURE 16, it will be seen that the conveyor drive shaft 296 is journaled for rotation in the frame 102 and is driven in rotation from the chain drive system 294. The sprockets 298 upon which the chains 286 of the bucket conveyors are mounted and by which they are driven, are non-rotatably mounted upon the conveyor drive shaft 296. Rotatably mounted upon the conveyor drive shaft 296 between the bucket conveyor driving sprockets 298 and the frame 102 are a pair of can conveyor driving sleeves 300. The can conveyor driving sprockets 70 are non-rotatably mounted upon and keyed to the driving sleeves 300. In addition each sleeve 300 has a second driving sprocket 302 non-rotatably mounted thereon by which it is driven. The sprockets 302 and thus the sleeves 300 and can conveyor chains 64, 66 are driven by a pair of chain drive systems 304 (FIGURES 5 and 16) from the constant speed auxiliary motor 72. This arrangement permits the can conveyor 12, 14 to be driven at a constant speed which is faster than the linear speed of the bucket conveyors 26. In this manner the cans are caused to stack up on the can conveyors behind the feed screws 24. This arrangement insures the fact that there is always an ample supply of cans being fed into the machine and that none of the cartons ever leave the machine only partially filled.

Referring to FIGURES 8 and 9, it will be seen that the forward ends of the inside guide rails 50, 52 of the can conveyors 12, 14 extend inwardly parallel to the axis of screws 24 from a point adjacent the rear end of the feed screws 24. These guide rails 50, 52 serve as an abutment surface and as a guide rail as the cans are fed off of the can conveyors 12, 14 and onto and across the bucket conveyors 26 to the cartons on the main carton transport conveyor 240. These inside guide rails end at a point immediately adjacent the sides of the main transport conveyor 240. Because the spacer brackets 28 on the bucket conveyor 26 must pass beneath the inside guide rails 50, 52 in order to maintain the cans in groups of three after they leave the feed screw and as they are fed into the cartons, the guide rails are mounted a distance above the conveyor at least equal to the height of the brackets.

In order to force the cans into the cartons, a pair of guides 30 extend across the bucket conveyors. Each of the guides 30 has a vertical inside surface 306 which is generally parallel to the axis of the feed screw with which each guide is associated and cooperates. The vertical surface 306 of the guides extends across the bucket conveyors above the spacer brackets 28 in a plane parallel to the ends of the guide rails 50, 52. Each guide is spaced from the guide rail with which it cooperates a distance equal to the diameter or width of the article being packaged. At the end nearest the infeed end of the conveyor, each of the guides 30 has a laterally and outwardly extending arm 308 which is pinned to a fixed bracket 310 mounted upon the frame 102 of the machine for pivotal movement relative thereto in a horizontal plane. Each guide has a second laterally and outwardly extending arm 312 near its front end. Near its lateral edge and on the top surface, each of the second arms 312 has a vertically extending protrusion 314. In addition each arm 312 has a generally lateral slot 316 extending therethru within which is received a stationary locating pin 318. Thus, each guide 30 may oscillate about its pivoted mounting in the bracket 310 to the limits of the slot 316.

At its outer end, each arm 312 of guide 30 has a stop abutment 320 extending therefrom. Each of these stop abutments are engageable with an adjustable stop 322 mounted upon the frame 102 of the machine. The abutments 320 are biased into engagement with the stops 322 by tension springs 324 which extend between the protrusions 314 on the ends of the arms 312 of the guides and fixed fingers 326 which are rigidly mounted upon the frame 102. This arrangement for supporting the guides 30 permits the guides to be adjusted laterally about their pivotal mountings and in addition permits the ends of the guides nearest the output end of the machine to move away from the main transport carton conveyor in the event of a jamb in the machine. If a jamb up of the cans in the machine should occur because of improper size cartons or cans, etc., the plows would move laterally against the spring bias and permit the cans to run off of the conveyor rather than causing breakage to the machine. In addition, such a jamb would cause the overload electric clutch 246 (FIGURE 5) to disengage and the electric brake 248 to operate and quickly bring the machine to a stop.

Referring to FIGURE 9, it will be seen that the cans are forced off of the bucket conveyor by the guides 30 in groups of three, and are moved laterally inwardly into the open sides of the cartons while the cartons and cans are simultaneously moving on their respective conveyors. At the time that the cans are loaded into the cartons, the bottom side flaps of the cartons are folded downwardly while the front, rear and top flaps extend outwardly without having been folded from the plane of the top, front and rear sides of the cartons.

*Flap handling and sealing mechanism*

As the cartons with the cans located therein progress down the main carton transport conveyor toward the output end of the machine, the sides of the carton must be closed and glued. In order to accomplish this function, the top flap and bottom flaps are folded upwardly and downwardly respectively. The front flaps and the rear flaps are folded inwardly toward the cans and have glue applied from a roller to the corners. Thereafter the top and bottom flaps are folded downwardly and upwardly respectively over the front and rear side flaps to cover the area which has had glue applied thereto. The flaps are held together under pressure as the filled and sealed carton progresses along the main carton transport conveyor and out of the machine.

Referring to FIGURES 5 and 17, it will be seen that a pair of top flap folding plows 328 and a pair of bottom flap folding plows 330 are mounted upon two vertical supports 332 on opposite sides of the main carton transport conveyor 240. The top and bottom folding plows extend parallel to the direction of movement of the main transport conveyor in a position immediately adjacent to the sides so that the plows will engage the outwardly extending top and bottom side flaps of the cartons as they pass down the conveyor. The ends 334 of the top flap folding plows 328 nearest the infeed end of the machine extend downwardly and outwardly (shown in phantom in FIGURE 17) in order that the plows will pick up any top flap which might happen to extend downwardly out of the horizontal plane. It is not necessary for the bottom side flap folding plows 330 to extend upwardly and outwardly at the end since the bottom side flaps 92 of the carton were folded downwardly by the cams 220 as the cartons were fed out of the hopper 19 and are held in the downwardly folded position as the cartons move along the conveyor by the flap hold down strips 223. The bottom flap folding plows 330 merely hold the downwardly folded bottom side flaps in the downwardly folded position as the cartons move along the machine past these plows.

Also mounted upon the vertically extending supports 332 at a point midway between the top flap folding plows 328 and the bottom flap folding plows 330 are a pair of side flap control strips 336. The rear edges 338 of the flap control strips are in a position to engage the front surface of the outwardly extending front side flaps of the cartons as they are fed along the main carton transport conveyor and to hold these flaps in a position in which they are folded inwardly.

The outwardly extending rear side flaps are also folded inwardly after the cans have been placed in the carton by rear flap folding mechanisms 340 mounted on opposite sides of the main carton transport conveyor at a point immediately in front of the ends of the bucket conveyor and to the rear of the side flap control strips 336.

Each of these rear side flap folding mechanisms consist of two endless chains 342, 344 which are mounted in parallel horizontal planes. Each of these chains has two flap engaging folding fingers 346 extending outwardly therefrom in a position to engage the rear flaps and push them inwardly toward the cans in the cartons. The flap engaging fingers 346 on the upper chains 342 are located in the same horizontal plane as the upper corners of the cartons on the main carton transport conveyor while the fingers on the lower chains 344 are located in the horizontal plane of the lower corners of the cartons on this conveyor. Each of the fingers 346 on the upper conveyor are located in the same vertical plane as one of the fingers on the lower chain so that the two rear flap closing fingers simultaneously engage the upper and lower corners of the rear flaps.

The upper and lower chains of each rear flap folding mechanism 340 are driven from a pair of sprockets 350 which are keyed or otherwise drivingly connected to a vertical shaft 353. The shafts 353 are rotatably mounted in brackets 352 and each shaft 353 has a bevel gear 354 connected to its lower end. In the rear, the upper and lower chains of each rear flap folding mechanism are supported by sprockets 356 which are mounted upon an idler shaft 358. The idler shafts 358 both extend vertically upwardly from supporting brackets 360 which are fixedly mounted upon the frame 102.

The beveled gears 354 on the vertical driving shafts 353 of both rear flap folding mechanisms are driven by a pair of spaced bevel gears 357, 359 on shaft 361. The shaft 361 is rotatably journaled in the brackets 352 and has the beveled gears 357, 359 drivingly connected thereto by a key or other driving means. One end of the drive shaft 361 is also rotatably journaled in a bracket 362 which is mounted upon a frame 102. At the end, drive shaft 361 has a driving sprocket 364 mounted thereon. The sprocket 364 is driven by a chain and sprocket system which is in turn driven by a second chain and sprocket arrangement 368 from the conveyor drive shaft 296. Since the rear flap folding mechanisms 340 are driven from the conveyor drive shaft, these folding mechanisms are synchronized with the conveyor drive mechanism and cycle with the conveyors.

The gear ratios between the conveyor drive shaft 296 and the rear flap folding mechanisms 340 is such that the rear flap folding fingers 346 travel a greater distance per cycle than the cartons on the main carton transport conveyor. Thus, for example, if the cartons travel ten inches per cycle, the rear flap folding fingers 346 should travel approximately twelve inches per cycle so that the fingers will come around the rear sprocket 356 and engage the outwardly extending rear side flaps from the back and as the carton continues moving down the conveyor, the fingers will push the flaps inwardly to a position normal to the rear of the carton before the carton has passed thru one cycle or has moved ten inches. In order to accomplish this, it is necessary that the flap engaging fingers move at a faster rate than the cartons. After the rear side flaps have been forced inwardly by the rear flap closing mechanisms they pass between the side flap control strips 336 and are held in the closed position by these strips.

With the top and bottom flaps of the cartons held upwardly by the top and bottom folding plows 328, 330 and the front side flaps and rear side flaps folded inwardly and held in this position by the strips 336, glue is applied to the tops and bottoms of the front side flaps and rear side flaps in the areas which will be covered by the top side flaps and bottom side flaps when the carton is finally closed. The glue applicators consist of a pair of conventional glue spot application rollers 32 mounted upon the frame 102 for rotation about a vertical axis.

The glue application rollers are supported for rotation at a point approximately midway in their length by a section 370 of the frame 102 and at the top by two brackets 372 which are mounted upon vertical posts 374. The peripheral surfaces of the rollers 32 have liquid glue placed thereon by a conventional glue applicator 376 (FIGURE 2). Wiper blades (not shown) are mounted upon each of the posts 374 and engage the peripheral surfaces of the rollers 32 to wipe off any excess glue which flows into glue overflow troughs 377 on each of the rollers. At the bottom, the glue rollers 32 each have a worm gear drivingly connected thereto which are meshed with and driven by worm gears mounted upon a horizontal drive shaft 378. The shaft 378 is driven by a conventional chain and sprocket drive (not shown) from the power supply shaft 256.

After the glue is applied to the front and rear side flaps, the top and bottom side flaps are folded downwardly and upwardly respectively over the front and rear side flaps to seal the cartons. The mechanism for folding the top side flaps downwardly consists of a pair of top flap closing plows 380 which are mounted along the sides of the main carton transport conveyor. The top flap closing plows 380 are spaced apart a distance equal approximately to the width of the cartons and are mounted on opposite sides of the main transport conveyor in the horizontal plane of the top surface of the cartons. Each of these plows is bolted on the inside surface of upright posts 382 which are rigidly connected to the frame of the machine. The rear end portion 383 of each of the top flap closing plows extends upwardly and inwardly so that the outside surface of these plows will engage the inner surface of the upstanding top flaps of the cartons as they advance on the conveyor and will cause the top flaps to be forced downwardly and under the inside surface of the plows against the front and rear side flaps.

The mechanism for folding the bottom side flaps upwardly over the front and rear side flaps consists of a pair of bottom flap closing plows 384. The bottom flap closing plows are both mounted in the same horizontal plane and directly below the top flap closing plows on the upright supports 382. Each of the bottom flap closing plows has a rear end portion 385 which is bent downwardly and inwardly. As the cartons progress along the main carton transport conveyor, the inside surfaces of the downwardly extending bottom flaps engage the end portion 385 of the bottom closing plows 384 and force the bottom side flaps to move up and under the bottom closing plows 385 over the front and rear side flaps of the cartons.

As the cartons are carried forward on the main transport conveyor with the front and rear side flaps folded inwardly and the top and bottom side flaps folded inwardly over the tops of the front and bottom side flaps in the area to which glue has been applied, the flaps are held in the closed position by the closing plows 380 and 384 long enough for the glue on the front and rear side flaps to dry and seal the side flaps in the closed positions.

As the advancing cartons approach the end of the main carton transport conveyor, a set of speed belts 34 mounted on opposite sides of the main transport conveyor frictionally engage the sides of the cartons and pull them off of the main transport conveyor. The purpose of these speed belts is to eliminate the possibility of the spacer lugs 244, on the main transport conveyor puncturing the rear side walls of the cartons as the spacer lugs travel around the driving sprockets 264. During the period when the spacer lugs are traveling around the sprockets 264, the linear velocity of the outside edges of the lugs is increased and there is a tendency for the outer edge surface to puncture the rear wall of the carton if the cartons are not moved away or pulled out of the machine in front of the lugs.

The speed belt arrangement 34 consists of a pair of belts 388 mounted upon each side of the conveyor and supported between a pair of driving pulleys 390 and a pair of driven pulleys 392. The driving pulleys 390 are keyed to a driven shaft 394 which is rotatably mounted in a supporting bracket 396 connected to the frame of the machine. The driven pulleys are supported upon vertical idler shafts 398 which are also mounted in the brackets 396.

Journaled in the brackets 396 is a horizontal drive shaft 400 which has a pair of spaced beveled gears 402 mounted thereon. These gears drive a pair of beveled gears on the shafts 394. The speed belt driving shaft 400 is driven by a chain and sprocket drive (not shown) from the drive shaft 262 of the main transport conveyor.

The machine is controlled from a console unit 404 (FIGURE 1) at one side of the machine. The console unit is connected electrically to the motors 72, 110 through conventional control circuitry (not shown) which controls the speed and starting and stopping of the motors.

It will be understood that the above detailed description is made by way of illustration and not limitation, it being contemplated that any modification of details of the invention may be made without departing from the scope of the appended claims.

Having described our invention we claim:

1. A cartoning machine for feeding and erecting cartons and for loading articles into the said cartons, said machine comprising magazine means for storing said cartons in a flat folded condition, means for feeding said cartons sequentially from said magazine, means for continuously moving said cartons in a path of travel after they are fed from said magazine, means for erecting said cartons as they are transported on said continuous moving means, said erected cartons having four side walls from which extend side wall flaps, means for controlling said side wall flaps to form two opposite open sides on said erected cartons, means for continuously moving two continuous streams of articles in a direction substantially parallel to the movement of said cartons adjacent the open sides of said cartons, feed screw means for moving said streams of articles from said continuous article moving means toward the open sides of said cartons and for segregating said articles into groups, said feed screw means having a spiral vane of increasing width thereon operable to space said articles into groups of articles spaced apart an increasing distance as they are moved along said feed screw by said spiral vane, each of said groups containing a plurality of articles, means for moving a group of articles into each open side of said cartons and means for moving and sealing said side wall flaps.

2. A cartoning machine for feeding and erecting cartons and for loading articles into the said cartons, said machine comprising magazine means for storing said cartons in a flat folded condition, means for feeding said cartons sequentially from said magazine, means for continuously moving said cartons in a path of travel after they are fed from said magazine, means for erecting said cartons as they are transported on said continuous moving means, said erected cartons having four side walls from which extend side wall flaps, means for controlling said side wall flaps to form at least one open side on said erected cartons, means for continuously moving a continuous stream of articles in a direction substantially parallel to the movement of said cartons adjacent the open side of said cartons, feed screw means for feeding said articles toward said cartons and for segregating said continuous stream of articles into groups, said feed screw having a spiral vane of increasing width thereon operable to space said articles into groups of articles spaced apart an increasing distance as they are moved along said feed screw by said spiral vane, each of said groups containing a plurality of articles, and means for moving said spaced groups of articles into the open side of said cartons.

3. A cartoning machine for feeding and erecting cartons and for loading articles into the said cartons, said cartons having front, rear, top and bottom side walls and side wall flaps extending from each of said walls, said machine comprising magazine means for storing said cartons in a flat folded condition, means for feeding said flat folded cartons sequentially from said magazine, first means for continuously moving said flat folded cartons in a path of travel after they are fed from said magazine, first means for partially erecting said cartons as they are transported on said first continuous moving means, said first means for partially erecting said cartons including means for folding said bottom flaps downwardly and holding them in the downwardly folded position as said cartons are partially erected and a pair of spaced vertically inclined members engageable with said front flaps and up which said front flaps are slideable as said cartons are partially erected, second means for continuously moving said cartons in said path of travel, said second carton moving means having means thereon cooperable with said first carton moving means for completing the carton erection as the cartons are transferred from said first carton moving means to said second carton moving means, means for controlling said side wall flaps to form two opposite open sides on said erected carton, means for continuously moving two continuous streams of articles in a direction substantially parallel to the movement of said cartons adjacent the open sides of said cartons, means for segregating said continuous streams of articles into groups, means for moving said groups of articles into the open sides of the cartons and means for moving and sealing said side wall flaps.

4. A cartoning machine for feeding and erecting cartons and for loading articles into the said cartons, said cartons having front, rear, top, and bottom side walls and side wall flaps extending from each of said walls, said machine comprising magazine means for storing said cartons in a flat folded condition, means for feeding said flat folded cartons sequentially from said magazine, first means for continuously moving said flat folded cartons in a path of travel after they are fed from said magazine, first means for partially erecting said cartons as they are transported on said first continuous moving means, said first means for partially erecting said cartons including means for folding said bottom flaps downwardly and holding them in the downwardly folded position as said cartons are partially erected and a pair of spaced vertically inclined members engageable with said front flaps and up which said front flaps are slidable as said carton is partially erected, second means for continuously moving said cartons along said path of travel, said second carton moving means having means thereon cooperable with said first carton moving means for completing the carton erection as the cartons are transferred from said first carton moving means to said second carton moving means, means for controlling said side wall flaps to form at least one open side on said erected cartons, means for continuously moving a continuous stream of articles in a direction substantially parallel to the movement of said cartons adjacent the open side of said cartons, means for segregating said continuous stream of articles into groups, means for moving said groups of articles into the open side of the cartons and means for moving and sealing said side wall flaps.

5. A cartoning machine for feeding and erecting cartons and for loading articles into the said cartons, said cartons having front, rear, top, and bottom side walls and side wall flaps extending from each of said walls, said machine comprising magazine means for storing said cartons in a flat folded condition, means for feeding said flat folded cartons sequentially from said magazine, first means for continuously moving said flat folded cartons in a path of travel after they are fed from said magazine, first means for partially erecting said cartons as they are transported on said first continuous moving means, said first means for partially erecting said cartons including means for folding said bottom flaps downwardly and holding them in the downwardly folded position as said cartons are partially erected and a pair of spaced vertically inclined members engageable with said front flaps and up which said front flaps are slidable as said carton is partially erected, second means for continuously moving said cartons along said path of travel, said second carton moving means having lugs thereon adapted to abut against the front and rear of said cartons and cooperable with said first carton moving means for completing the carton erection as the cartons are transferred from said first carton moving means to said second carton moving means, means for controlling said side wall flaps to form two opposite open sides on said erected carton, means for continuously moving two continuous streams of articles in a direction substantially parallel to the movement of said cartons adjacent the open sides of said cartons, means for segregating said continuous streams of articles into groups, means for moving said groups of articles into the open sides of the cartons and means for moving and sealing said side wall flaps.

6. A cartoning machine for feeding and erecting cartons and for loading articles into the said cartons, said cartons having front, rear, top, and bottom side walls and side wall flaps extending from each of said walls, said machine comprising magazine means for storing said cartons in a flat folded condition, means for feeding said flat folded cartons sequentially from said magazine, means for moving said flat folded cartons in a path of travel after they are fed from said magazine, means for erecting said cartons as they are transported on said moving means, said carton erecting means including means for folding said bottom flaps downwardly and holding them in a downwardly folded position as said cartons are initially opened and a pair of spaced vertically inclined members up which said front flaps are slidable to initially open said cartons and a rotatable member engageable with said top wall flaps of said partially opened cartons to force said cartons into the fully erected position, means for controlling said side wall flaps to form at least one open side on said erected cartons, means for moving a stream of articles in a direction substantially parallel to the movement of said cartons adjacent the open side of said cartons, means for segregating said continuous stream of articles into groups, means for moving said groups of articles into the open side of the cartons and means for moving and sealing said side wall flaps.

7. A machine for loading articles into cartons each having at least one open side comprising means for continuously moving the cartons in a path of travel, means for continuously moving a stream of articles in a direction substantially parallel to the movement of said cartons adjacent the open side of said cartons, feed screw means for feeding said articles and for segregating said continuous stream of articles into groups, said feed screw having a spiral vane of increasing width thereon operable to space said articles into groups of articles spaced apart an increasing distance as they are moved along said feed screw by said spiral vane, each of said groups containing a plurality of articles, and means for moving said spaced groups of articles into the open side of the cartons.

8. A carton feeding and erecting mechanism comprising a magazine for storing a plurality of flat folded cartons, spaced members forming the bottom of said magazine and engageable with two opposite sides of the lowermost carton in said magazine, reciprocal suction cup means mounted beneath said magazine and engageable with the bottom surface of the lowermost carton to bow said lowermost carton downwardly while said spaced members remain in engagement with said two opposite sides of said lowermost carton, a pair of movable members engageable with a second pair of opposite sides of said bowed lowermost carton, means to move said movable members between said bowed lowermost carton and the other cartons in said magazine while said bowed carton remains in engagement with said spaced members so as to maintain said lowermost carton in the bowed position after the carton is released by said suction cup means, conveyor means for pushing said bowed carton out of said magazine, and means along the path of movement of said conveyor means for erecting said flat folded cartons.

9. A cartoning machine for feeding and erecting cartons and for loading articles into the said cartons, said machine comprising magazine means for storing said cartons in a flat folded condition, means for feeding said cartons sequentially from said magazine, means for continuously moving said cartons in a path of travel after they are fed from said magazine, means for erecting said cartons as they are transported on said continuous moving means, said erected cartons having four side walls from which extend side wall flaps, means for controlling said side wall flaps to form two opposite open sides on said erected carton, means for continuously moving two continuous streams of articles in a direction substantially parallel to the movement of said cartons adjacent the open sides of said cartons, feed screw means having a spiral vane of increasing width thereon operable to space said articles into groups of articles spaced apart an increasing distance as they are moved along said feed screw by said spiral vane, each of said groups containing a plurality of articles, means for moving each of said groups or articles into one of the open sides of one of the cartons and means for sealing said side wall flaps after said articles have been inserted into said cartons.

10. A carton feeding mechanism comprising a magazine for storing a stack of flat cartons, a pair of spaced members forming the bottom of said magazine and engageable with two oppoiste sides of the lowermost carton in said stack, reciprocal suction cup means mounted beneath said magazine and engageable with the bottom surface of the lowermost carton to bow the center portion of said lowermost carton downwardly while said spaced members remain in engagement with said two opposite sides of said lowermost carton, a movable detent member mounted on said magazine and engageable with a third side of said lowermost carton, means to move said detent member between said bowed lowermost carton and the other cartons in said magazine while said bowed carton remains in engagement with said spaced members, and means engageable with said bowed center portion of said lowermost carton to remove it from said magazine.

11. A carton feeding mechanism comprising a magazine for storing a stack of flat cartons, a pair of spaced members forming the bottom of said magazine and engageable with two opposite sides of the lowermost carton in said stack, reciprocal suction cup means mounted beneath said magazine and engageable with the bottom surface of the lowermost carton to bow the center portion of said lowermost carton downwardly while said spaced members remain in engagement with said two opposite sides of said lowermost carton, a pair of movable detent members mounted on said magazine and engageable with two other opposite sides of said lowermost carton, means to move said detent member between said bowed lowermost carton and the other cartons in said magazine while said bowed carton remains in engagement with said spaced members, and means engageable with said bowed center portion of said lowermost carton to push it from said magazine.

12. A carton feeding mechanism comprising a magazine for storing a stack of flat cartons, a pair of spaced members forming the bottom of said magazine and engageable with two opposite sides of the lowermost carton in said stack, reciprocal suction cup means mounted beneath said magazine and engageable with the bottom surface of the lowermost carton to bow the center portion of said lowermost carton downwardly while said spaced members remain in engagement with said two opposite sides of said lowermost carton, a rotatable cam operable to cause reciprocation of said suction cup means, a pair of movable detent members mounted on said magazine and engageable with two other sides of said lowermost carton, cam means operable in timed relation with said suction cup moving cam to move said detent members between said bowed lowermost carton and the other cartons in said magazine while said bowed carton remains in engagement with said spaced members, and means engageable with said bowed center portion of said lowermost carton to push it from said magazine.

13. A carton feeding mechanism comprising a magazine for storing a stack of flat cartons, a pair of spaced stationary members forming the bottom of said magazine and engageable with two opposite sides of the lowermost carton in said stack, reciprocal suction cup means mounted beneath said magazine and engageable with the bottom surface of the lowermost carton to bow the center portion of said lowermost carton downwardly while said spaced members remain in engagement with said two opposite sides of said lowermost carton, cam means operable to reciprocate said suction cup means, a pair of movable detent members mounted on said magazine and engageable with two other opposite sides of said lowermost carton, a pair of cams operable in timed relation with said suction cup moving cam to move said detent members between said bowed lowermost carton and the other cartons in said magazine while said bowed carton remains in engagement with said spaced members, spring means for biasing said detent members into engagement with said detent moving cams, and conveyerized lugs engageable with said bowed center portion of said lowermost carton to push it from said magazine.

14. The carton feeding mechanism of claim 13 wherein said detent members are mounted upon said magazine for pivoted movement relative thereto.

15. A carton feeding mechanism comprising a magazine for storing a stack of flat folded cartons, a pair of spaced members forming the bottom of said magazine and engageable with two opposite sides of the lowermost carton in said stack, reciprocal suction cup means mounted beneath said magazine and engageable with the bottom surface of the lowermost carton to bow the center portion of said lowermost carton downwardly while said spaced members remain in engagement with said two opposite sides of said lowermost carton, a movable detent member mounted on said magazine and engageable with a third side of said lowermost carton, means to move said detent member between said bowed lowermost carton and the other cartons in said magazine while said bowed carton remains in engagement with said spaced members, conveyer means engageable with said bowed center portion of said lowermost carton to transport it from said magazine, and means along the path of movement of said conveyer for erecting said flat folded carton.

16. A carton feeding and erecting mechanism for handling cartons having front, rear, top, and bottom side walls and flaps extending outwardly from said walls, comprising a magazine for storing said cartons in a flat folded condition, means for feeding said flat cartons sequentially one at a time from said magazine, conveyer means for transporting said cartons along a path of travel, first means for partially opening said flat folded cartons comprising means for folding said bottom flaps downwardly and holding them in a downwardly folded position as said carton is partially opened and a pair of spaced vertically inclined members extending upwardly and forwardly in a path of said conveyer and engageable with said front flaps to cause said cartons to be partially erected as said flaps slide over said inclined members, and second means for completing the erection of said partially erected cartons.

17. The carton feeding and erecting mechanism of claim 16 wherein said second means is a rotatable member having a lug engageable with the bottom surface of said top flaps operable to lift said top flaps and thus move said partially opened cartons into the fully erected position.

18. A cartoning machine for feeding and erecting cartons and for loading articles into said cartons, said machine comprising a magazine for storing a stack of flat folded cartons, stationary members forming the bottom of said magazine and engageable with two opposite sides of the lowermost carton in said stack, reciprocal suction cup means mounted beneath said magazine and engageable with the bottom surface of the lowermost carton to bow the center portion of the lowermost carton downwardly while said stationary members remain in engagement with said two opposite sides of said lowermost carton, a movable detent member mounted on said magazine adjacent a third side of said lowermost carton, means to move said detent member between said bowed lowermost carton and the other cartons in said magazine while said bowed carton remains in engagement with said stationary members, and conveyerized lugs engageable with said bowed center portion of said lowermost carton to push it from said magazine, further conveyerized means for moving said cartons in a horizontal path of travel, means for erecting said cartons as they are transported on said further conveyerized means, said erected cartons having four side walls from which extend side wall flaps, means for controlling said side wall flaps to form at least one open side on said erected cartons, means for moving a stream of articles in a direction substantially parallel to the movement of said cartons adjacent the open side of said cartons, means for segregating said continuous stream of articles into groups, each of said groups containing a plurality of articles, means for moving said groups of articles into the open side of the cartons, and means for sealing said side wall flaps.

References Cited by the Examiner
UNITED STATES PATENTS

| | | | |
|---|---|---|---|
| 2,188,306 | 1/40 | Murch | 53—281 X |
| 2,561,404 | 7/51 | Nordquist | 53—281 X |
| 2,896,520 | 7/59 | Woelfer | 53—186 X |
| 3,007,293 | 11/61 | McGihon | 53—186 X |
| 3,032,945 | 5/62 | Currie et al. | 53—48 |
| 3,058,271 | 10/62 | McGihon | 53—48 X |
| 3,083,510 | 4/63 | Ganz | 53—48 |

FRANK E. BAILEY, *Primary Examiner.*

WILLIAM B. PENN, TRAVIS S. McGEHEE,
*Examiners.*